US012626653B2

(12) United States Patent
Luo

(10) Patent No.: US 12,626,653 B2
(45) Date of Patent: May 12, 2026

(54) DISPLAY PANEL AND METHOD FOR RENDERING SUBPIXELS OF THE DISPLAY PANEL

(71) Applicant: Kunshan Yunyinggu Electronic Technology Co., Ltd., Kunshan (CN)

(72) Inventor: Xixi Luo, Kunshan (CN)

(73) Assignee: Kunshan Yunyinggu Electronic Technology Co., Ltd., Kunshan (CN)

( * ) Notice: Subject to any disclaimer, the term of this patent is extended or adjusted under 35 U.S.C. 154(b) by 0 days.

(21) Appl. No.: 18/210,705

(22) Filed: Jun. 16, 2023

(65) Prior Publication Data

US 2024/0404462 A1 Dec. 5, 2024

Related U.S. Application Data

(63) Continuation of application No. PCT/CN2023/098178, filed on Jun. 3, 2023.

(51) Int. Cl.
*G09G 3/20* (2006.01)
*G09G 3/3225* (2016.01)

(52) U.S. Cl.
CPC ......... *G09G 3/3225* (2013.01); *G09G 3/2074* (2013.01); *G09G 2300/0452* (2013.01);
(Continued)

(58) Field of Classification Search
CPC . H10K 59/35; H01L 27/3225; H01L 27/3227; H01L 27/3234
See application file for complete search history.

(56) References Cited

U.S. PATENT DOCUMENTS

2006/0250399 A1* 11/2006 Bando .................... G06T 15/005 345/441
2012/0014597 A1* 1/2012 Matsunaga ............ H04N 1/644 382/166

(Continued)

FOREIGN PATENT DOCUMENTS

CN 104347668 A 2/2015
CN 107004392 A 8/2017

(Continued)

OTHER PUBLICATIONS

International Search Report in related PCT Application No. PCT/CN2023/098178 dated Mar. 2, 2024 (4 pages).

*Primary Examiner* — Yuzhen Shen
(74) *Attorney, Agent, or Firm* — Bayes PLLC

(57) ABSTRACT

The present disclosure provides a method for rendering subpixels of a display panel. The method includes: selecting a repeating module from a first database based on correspondences between a driving unit of a driving circuit of the display panel and a number of subpixels driven by the driving unit; dividing the subpixels of the display panel into a plurality of regions based on the selected repeating module; selecting a sampling range for each subpixel from a second database based on a position of the subpixel within the repeating module; sampling input display data for each subpixel based on the selected sampling range of the subpixel; and rendering the subpixel according to the sampled input display data. The first database comprises a plurality of pre-stored repeating modules, and the second database comprises a plurality of pre-stored sampling ranges.

20 Claims, 17 Drawing Sheets

(52) U.S. Cl.
CPC ............... *G09G 2310/0202* (2013.01); *G09G 2310/0294* (2013.01); *G09G 2370/022* (2013.01)

(56) References Cited

U.S. PATENT DOCUMENTS

| | | | | |
|---|---|---|---|---|
| 2013/0113997 | A1 | 5/2013 | Lee et al. | |
| 2016/0125851 | A1* | 5/2016 | Jin | G09G 3/20 345/545 |
| 2016/0365044 | A1* | 12/2016 | Chu Ke | G09G 3/3607 |
| 2017/0004640 | A1* | 1/2017 | Chu Ke | G02F 1/134309 |
| 2017/0162111 | A1* | 6/2017 | Kang | G09G 3/3225 |
| 2018/0190725 | A1* | 7/2018 | Lu | G09G 3/2074 |
| 2024/0062720 | A1* | 2/2024 | Ma | G09G 3/3233 |

FOREIGN PATENT DOCUMENTS

| | | | | |
|---|---|---|---|---|
| CN | 107390441 | A | 11/2017 | |
| CN | 108492723 | A | 9/2018 | |
| CN | 110599954 | A | 12/2019 | |
| CN | 110945582 | A | 3/2020 | |
| CN | 112038373 | A | * 12/2020 | H01L 27/3225 |
| CN | 114141821 | A | 3/2022 | |
| CN | 115512654 | A | 12/2022 | |
| CN | 116052569 | A | 5/2023 | |
| TW | I678687 | B | 2/2019 | |

* cited by examiner

800

| |
|---|
| PERIOD INDEX = N |
| SAMPLING RANGE 0 = U |
| SAMPLING RANGE 1 = Q |
| SAMPLING RANGE 2 = S |
| SAMPLING RANGE 3 = T |
| SAMPLING RANGE 4 = P |
| SAMPLING RANGE 5 = R |
| SAMPLING RANGE 6 = U |
| SAMPLING RANGE 7 = Q |
| SAMPLING RANGE 8 = S |
| SAMPLING RANGE 9 = P |
| SAMPLING RANGE 10 = R |
| SAMPLING RANGE 11 = Q |
| SAMPLING RANGE 12 = null |
| SAMPLING RANGE 13 = null |
| SAMPLING RANGE 14 = null |
| SAMPLING RANGE 15 = null |

FIG. 17

| PERIOD INDEX R | PERIOD INDEX G | PERIOD INDEX B |
|---|---|---|
| SAMPLING RANGE R0 | SAMPLING RANGE G0 | SAMPLING RANGE B0 |
| SAMPLING RANGE R1 | SAMPLING RANGE G1 | SAMPLING RANGE B1 |
| SAMPLING RANGE R2 | SAMPLING RANGE G2 | SAMPLING RANGE B2 |
| SAMPLING RANGE R3 | SAMPLING RANGE G3 | SAMPLING RANGE B3 |
| SAMPLING RANGE R4 | SAMPLING RANGE G4 | SAMPLING RANGE B4 |
| SAMPLING RANGE R5 | SAMPLING RANGE G5 | SAMPLING RANGE B5 |
| SAMPLING RANGE R6 | SAMPLING RANGE G6 | SAMPLING RANGE B6 |
| SAMPLING RANGE R7 | SAMPLING RANGE G7 | SAMPLING RANGE B7 |
| SAMPLING RANGE R8 | SAMPLING RANGE G8 | SAMPLING RANGE B8 |
| SAMPLING RANGE R9 | SAMPLING RANGE G9 | SAMPLING RANGE B9 |
| SAMPLING RANGE R10 | SAMPLING RANGE G10 | SAMPLING RANGE B10 |
| SAMPLING RANGE R11 | SAMPLING RANGE G11 | SAMPLING RANGE B11 |
| SAMPLING RANGE R12 | SAMPLING RANGE G12 | SAMPLING RANGE B12 |
| SAMPLING RANGE R13 | SAMPLING RANGE G13 | SAMPLING RANGE B13 |
| SAMPLING RANGE R14 | SAMPLING RANGE G14 | SAMPLING RANGE B14 |
| SAMPLING RANGE R15 | SAMPLING RANGE G15 | SAMPLING RANGE B15 |

FIG. 18

| | | |
|---|---|---|
| PERIOD INDEX R = B | PERIOD INDEX G = A | PERIOD INDEX B = B |
| SAMPLING RANGE R0 = U | SAMPLING RANGE G0 = U | SAMPLING RANGE B0 = U |
| SAMPLING RANGE R1 = T | SAMPLING RANGE G1 = null | SAMPLING RANGE B1 = T |
| SAMPLING RANGE R2 = null | SAMPLING RANGE G2 = null | SAMPLING RANGE B2 = null |
| SAMPLING RANGE R3 = null | SAMPLING RANGE G3 = null | SAMPLING RANGE B3 = null |
| SAMPLING RANGE R4 = null | SAMPLING RANGE G4 = null | SAMPLING RANGE B4 = null |
| SAMPLING RANGE R5 = null | SAMPLING RANGE G5 = null | SAMPLING RANGE B5 = null |
| SAMPLING RANGE R6 = null | SAMPLING RANGE G6 = null | SAMPLING RANGE B6 = null |
| SAMPLING RANGE R7 = null | SAMPLING RANGE G7 = null | SAMPLING RANGE B7 = null |
| SAMPLING RANGE R8 = null | SAMPLING RANGE G8 = null | SAMPLING RANGE B8 = null |
| SAMPLING RANGE R9 = null | SAMPLING RANGE G9 = null | SAMPLING RANGE B9 = null |
| SAMPLING RANGE R10 = null | SAMPLING RANGE G10 = null | SAMPLING RANGE B10 = null |
| SAMPLING RANGE R11 = null | SAMPLING RANGE G11 = null | SAMPLING RANGE B11 = null |
| SAMPLING RANGE R12 = null | SAMPLING RANGE G12 = null | SAMPLING RANGE B12 = null |
| SAMPLING RANGE R13 = null | SAMPLING RANGE G13 = null | SAMPLING RANGE B13 = null |
| SAMPLING RANGE R14 = null | SAMPLING RANGE G14 = null | SAMPLING RANGE B14 = null |
| SAMPLING RANGE R15 = null | SAMPLING RANGE G15 = null | SAMPLING RANGE B15 = null |

FIG. 19

DISPLAY PANEL AND METHOD FOR RENDERING SUBPIXELS OF THE DISPLAY PANEL

CROSS REFERENCE TO RELATED APPLICATIONS

This application is a continuation of International Application No. PCT/CN2023/098178, filed on Jun. 3, 2023, which is hereby incorporated by reference in its entirety.

BACKGROUND

The disclosure relates generally to display technologies, and more particularly, to a display panel and a method for rendering thereof.

Under-display cameras (UDC) are designed to achieve a full-screen display effect, which are popular in cell phone screens. A region of a display panel above the UDC is specially designed with through holes for light to pass through. The through holes are distributed among and remove part of a plurality of driving units that are impervious to light, so that the region above the UDC allows light to pass through while performing display functions. Therefore, each driving unit above the UDC drives more than one subpixel. For example, "two by one" means two subpixels are controlled by a same driving unit, and "four by one" means four subpixels are controlled by the same driving unit. Similar designs include "three by one," "six by one," etc. The correspondences between the subpixels and the driving units are designed based on practical needs and vary with the type of the display panel. Method and algorithm for rendering a display are closely related to the correspondence, as the correspondences of different types of display panel vary, it is necessary to tailor-make method and algorithm to a certain display to get a great display effect, which brings a large workload.

SUMMARY

In one example, a method for rendering subpixels of a display panel is provided. The method includes: selecting a repeating module from a first database based on correspondences between a driving unit of a driving circuit of the display panel and a number of subpixels driven by the driving unit; dividing the subpixels of the display panel into a plurality of regions based on the selected repeating module, each region of the plurality of regions including at least one subpixel; selecting a sampling range for each subpixel from a second database based on a position of the subpixel within the repeating module; sampling input display data for each subpixel based on the selected sampling range of the subpixel; and rendering the subpixel according to the sampled input display data. The first database includes a plurality of pre-stored repeating modules corresponding to the correspondences one by one, and the second database includes a plurality of pre-stored sampling ranges corresponding to a plurality of positions in a plurality of repeating modules.

In one implementation, the subpixels driven by a same driving unit have a same color, and a minimal number of subpixels driven by a same driving unit is one.

In one implementation, the correspondences include: a first correspondence between a number of red subpixels driven by a same driving unit; a second correspondence between a number of green subpixels driven by a same driving unit; and a third correspondence between a number of blue subpixels driven by a same driving unit.

In one implementation, the subpixels are arranged based on Pentile arrangement, delta arrangement, or a GGRB arrangement.

In one implementation, each repeating module in the first database is assigned with a first index number, and a repeating module is selected by retrieving the first index number relating to the repeating module.

In one implementation, subpixels in different positions of a repeating module have different sampling strategies.

In one implementation, a minimal number of subpixels in a repeating module is one, and a maximal number of subpixels in a repeating module is sixteen.

In one implementation, each sampling range includes a anchored subpixel for sampling, when the sampling range is resigned to a subpixel, the subpixel is placed as the anchored subpixel.

In one implementation, each sampling range includes a plurality of peripheral subpixels around the anchored subpixel.

In one implementation, a distance between a peripheral subpixel and the anchored subpixel is smaller than two subpixels.

In one implementation, each sampling range in the second database is assigned with a second index number, and a sampling range is selected by retrieving the second index number corresponding to the sampling range.

In one implementation, the plurality of regions are rendered based on a sequence carried by the input display data, and the subpixels in a same region are rendered at a same time.

In another example, a method for rendering subpixels of a display panel is provided. The method includes: selecting a repeating module from a first database based on correspondences between a driving unit of a driving circuit of the display panel and a number of subpixels driven by the driving unit; dividing the subpixels of the display panel into a plurality of regions based on the selected repeating module, each region of the plurality of regions including at least one subpixel, and each subpixel is assigned with a sampling range based on a position of the subpixel within the repeating module; sampling input display data for each subpixel according to the sampling range of the subpixel; and rendering the subpixel according to the sampled input display data. The first database includes a plurality of pre-stored repeating modules corresponding to a plurality of display panel design strategies.

In one implementation, the subpixels driven by a same driving unit have a same color, and a minimal number of subpixels driven by a same driving unit is one.

In one implementation, the correspondences include: a first correspondence between a number of red subpixels driven by a same driving unit; a second correspondence between a number of green subpixels driven by a same driving unit; and a third correspondence between a number of blue subpixels driven by a same driving unit.

In one implementation, each repeating module in the first database is assigned with a first index number, and a repeating module is selected by retrieving the first index number relating to the repeating module.

In one implementation, subpixels in different positions of a repeating module have different sampling strategies.

In one implementation, each sampling range includes a anchored subpixel for sampling; when the sampling range is resigned to a subpixel, the subpixel is placed as the anchored subpixel.

In one implementation, each sampling range includes a plurality of peripheral subpixels around the anchored subpixel, and a distance between a peripheral subpixel and the anchored subpixel is smaller than two subpixels.

In another example, a display panel including an under-display camera is provided. The display panel includes a processor configured to, upon executing instructions: select a repeating module from a first database based on correspondences between a driving unit of a driving circuit of the display panel and a number of subpixels driven by the driving unit; divide the subpixels of the display panel into a plurality of regions based on the selected repeating module, each region of the plurality of regions including at least one subpixel; select a sampling range for each subpixel from a second database based on a position of the subpixel within the repeating module; sample input display data for each subpixel based on the selected sampling range of the subpixel; and render the subpixel according to the sampled input display data. The first database includes a plurality of pre-stored repeating modules corresponding to the correspondences one by one, and the second database includes a plurality of pre-stored sampling ranges corresponding to a plurality of positions in a plurality of repeating modules.

BRIEF DESCRIPTION OF THE DRAWINGS

FIG. 17 is an example of the rendering table in FIG. 16 in accordance with an implementation.

FIG. 18 is a rendering table including a period index and a plurality of sampling ranges for three types of subpixels in accordance with an implementation.

FIG. 19 is an example of the rendering table in FIG. 18 in accordance with an implementation.

DETAILED DESCRIPTION

Figure 1:
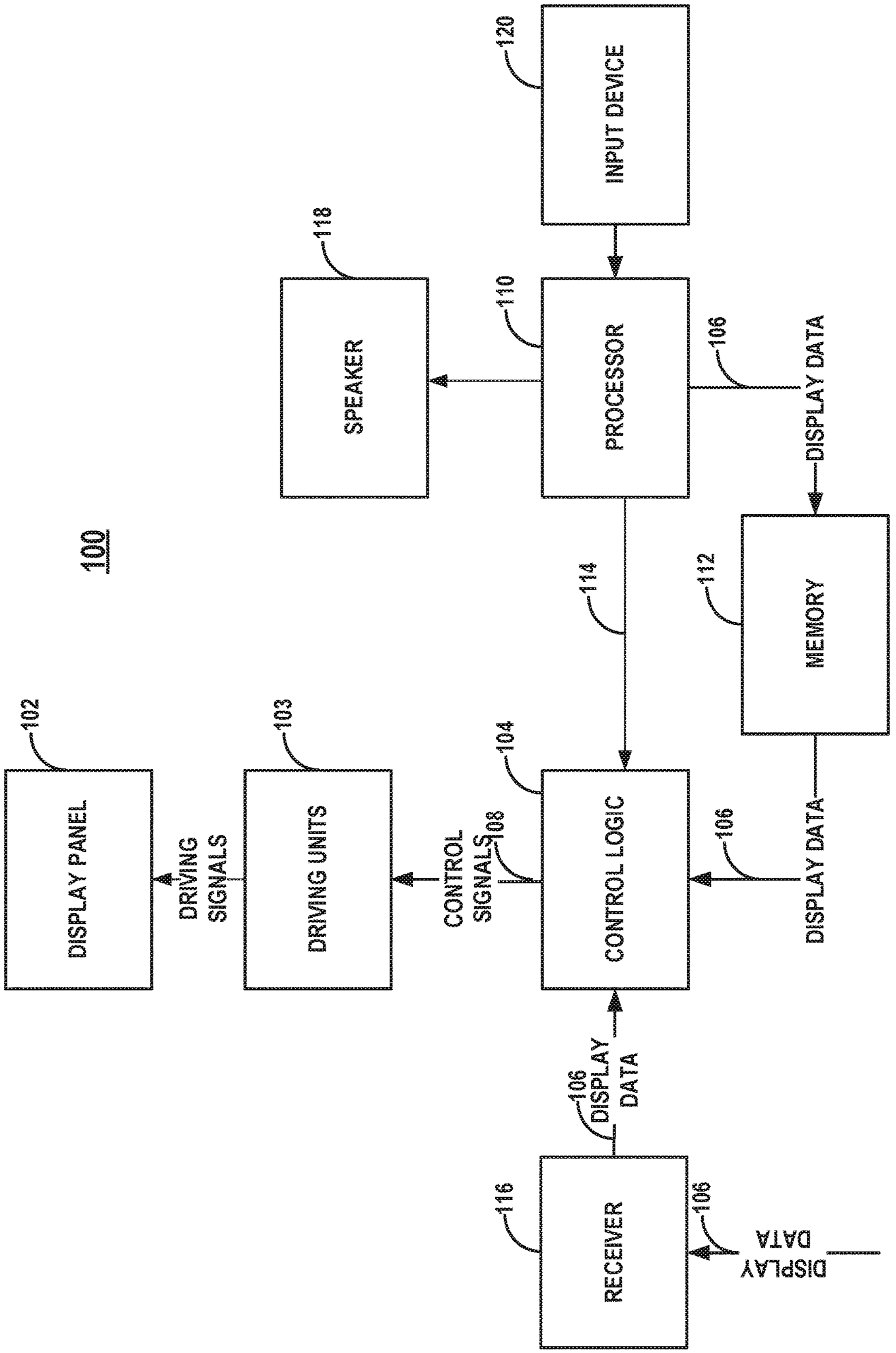
FIG. 1 is a block diagram illustrating an apparatus including a display and control logic in accordance with an implementation.

In the following detailed description, numerous specific details are set forth by way of examples in order to provide a thorough understanding of the relevant disclosures. It should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Throughout the specification and claims, terms may have nuanced meanings suggested or implied in context beyond an explicitly stated meaning. Likewise, the phrase "in one implementation/example" as used herein does not necessarily refer to the same implementation and the phrase "in another implementation/example" as used herein does not necessarily refer to a different implementation. It is intended, for example, that claimed subject matter includes combinations of example implementations in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In the present disclosure, each pixel or subpixel of a display panel can be directed to assume a luminance/pixel value discretized to the standard set [0, 1, 2, . . . , $(2^N-1)$], where N represents the bit number and is a positive integer. A triplet of such pixels/subpixels provides the red (R), green (G), and (blue) B components that make up an arbitrary color that can be updated in each frame. Each of the pixel values corresponds to a different grayscale value. For ease of description, the grayscale value of a pixel is also discretized to a standard set [0, 1, 2, . . . , $(2^N-1)$]. In the present disclosure, a pixel value and a grayscale value each represents the voltage applied on the pixel/subpixel. In the present disclosure, a grayscale mapping correlation lookup table (LUT) is employed to describe the mapping correlation between a grayscale value of a pixel and a set of mapped pixel values of subpixels. In the present disclosure, the display data of a pixel can the represented in the forms of different attributes. For example, display data of a pixel can be represented as (R, G, B), where R, G, and B each represents a respective pixel value of a subpixel in the pixel. In another example, the display data of a subpixel can be represented as (Y, x, y), where Y represents the luminance value, and x and y each represents a chrominance value. For illustrative purposes, the present disclosure only describes a pixel having three subpixels, each displaying a different color (e.g., R, G, B colors). It should be appreciated that the disclosed methods can be applied to pixels having any suitable number of subpixels that can separately display various colors, such as 2 subpixels, 4 subpixels, 5 pixels, and so forth. The number of subpixels and the colors displayed by the subpixels should not be limited by the implementations of the present disclosure.

In a display with an under-display camera (UDC), a correspondence between subpixels and driving units in a region where a UDC placed is different from a correspondence between subpixels and driving units in a region without a UDC. In the former situation, more than one subpixel is driven by a same driving unit to save area from forming through holes for light to pass through. In the later situation, usually, the subpixels correspond to driving units one by one to get an optimal display effect. Sampling ranges corresponding to different correspondences are different. For example, a sampling range of a subpixel in a “four by one” correspondence covers the subpixel itself, a first subpixel on the left of the sampled subpixel, a second subpixel under the sampled subpixel, and a third subpixel between the first and second subpixel; while a sampling range of a subpixel in a “six to one” correspondence covers the subpixels itself, a first subpixel on the left of the sampled subpixel, a second subpixel under the sampled subpixel, a third subpixel between the first and second subpixel, a fourth subpixel on the left of the first subpixel, and a fifth subpixel on the left of the second subpixel. To eliminate such a difference, method and algorithm need to be designed carefully when rendering the display. There are quite a variety of displays on the market, tailor-making rendering method for each type of display brings a large workload and is hard to complete.

As will be disclosed in detail below, among other novel features, the display panel, and method disclosed herein is suitable for a variety of display panels with different correspondences between subpixels and driving units. The method for rendering a display panel in the present disclosure includes a fixed part and an adjustable part. The fixed part is the common part suitable for every type of display panel, while the adjustable part can be tailor-made to fit the correspondence of a certain type of display panel. As a part of the adjustable part, possible sampling ranges are pre-designed and enumerated. When a correspondence of a display is confirmed, a corresponding sampling range for each subpixel is retrieved by its index number to obtain an optimal sampling range. As long as a sampling range corresponding to a certain type of display panel is pre-designed and pre-stored, an optimal display effect can be achieved by the rendering method provided by the present disclosure. Similarly, possible repeating modules of the subpixels of the display panel can be pre-designed and enumerated as well. The sampling ranges relate to the repeating modules by the position of the subpixel in the repeating module. By changing the adjustable part based on the correspondence of a display panel, the method provided by the present disclosure can solve the abovementioned problem without additional cost.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1 illustrates an apparatus 100 including a display panel 102, driving units 103, and control logic 104. The apparatus 100 may be any suitable device, for example, a television set, laptop computer, desktop computer, netbook computer, media center, handheld device (e.g., dumb or smart phone, tablet, etc.), electronic billboard, gaming console, set-top box, printer, or any other suitable device. In this example, the display panel 102 is operatively coupled to the control logic 104 via driving units 103 and is part of the apparatus 100, such as but not limited to, a television screen, computer monitor, dashboard, head-mounted display, or electronic billboard. The display panel 102 may be a liquid crystal display (LCD), organic light emitting diode (OLED) display, E-ink display, light emitting diode (LED) display, billboard display with incandescent lamps, or any other suitable type of display. The control logic 104 may be any suitable hardware, software, firmware, or combination thereof, configured to receive display data 106 and render the received display data 106 into control signals 108 for driving the array of subpixels of the display panel 102 by driving units 103. For example, subpixel rendering algorithms for various subpixel arrangements may be part of the control logic 104 or implemented by the control logic 104. The control logic 104 may include any other suitable components, including an encoder, a decoder, one or more processors, controllers (e.g., timing controller), and storage devices. Examples of the control logic 104 and methods for determining the grayscale mapping correlation in display panel 102 implemented by the control logic 104 or processor 110 are described in detail with reference to FIGS. 7 and 8, respectively. The apparatus 100 may also include any other suitable component such as, but not limited to, a speaker 118 and an input device 120, e.g., a mouse, keyboard, remote controller, handwriting device, camera, microphone, scanner, etc.

In one example, the apparatus 100 may be a laptop or cellphone having a display panel 102. In this example, the apparatus 100 also includes a processor 110 and memory 112. The processor 110 may be, for example, a graphic processor (e.g., GPU), a general processor (e.g., APU, accelerated processing unit; GPGPU, general-purpose computing on GPU), or any other suitable processor. The memory 112 may be, for example, a discrete frame buffer or a unified memory. The processor 110 is configured to generate display data 106 in display frames and temporally store the display data 106 in the memory 112 before sending it to the control logic 104. The processor 110 may also generate other data, such as but not limited to, control instructions 114 or test signals, and provide them to the control logic 104 directly or through the memory 112. The control logic 104 then receives the display data 106 from the memory 112 or from the processor 110 directly.

In another example, the apparatus 100 may be a television set having a display panel 102. In this example, the apparatus 100 also includes a receiver 116, such as but not limited to, an antenna, radio frequency receiver, digital signal tuner, digital display connectors, e.g., HDMI, DVI, DisplayPort, USB, Bluetooth, Wi-Fi receiver, or Ethernet port. The receiver 116 is configured to receive the display data 106 as an input of the apparatus 100 and provide the native or modulated display data 106 to the control logic 104.

In still another example, the apparatus 100 may be a handheld device, such as a smart phone or a tablet. In this example, the apparatus 100 includes the processor 110, memory 112, and the receiver 116. The apparatus 100 may both generate display data 106 by its processor 110 and receive display data 106 through its receiver 116. For example, the apparatus 100 may be a handheld device that works as both a portable television and a portable computing device. In any event, the apparatus 100 at least includes the display panel 102 with specifically designed subpixel arrangements as described below in detail and the control logic 104 for the specifically designed subpixel arrangements of the display panel 102.

Figure 2A:
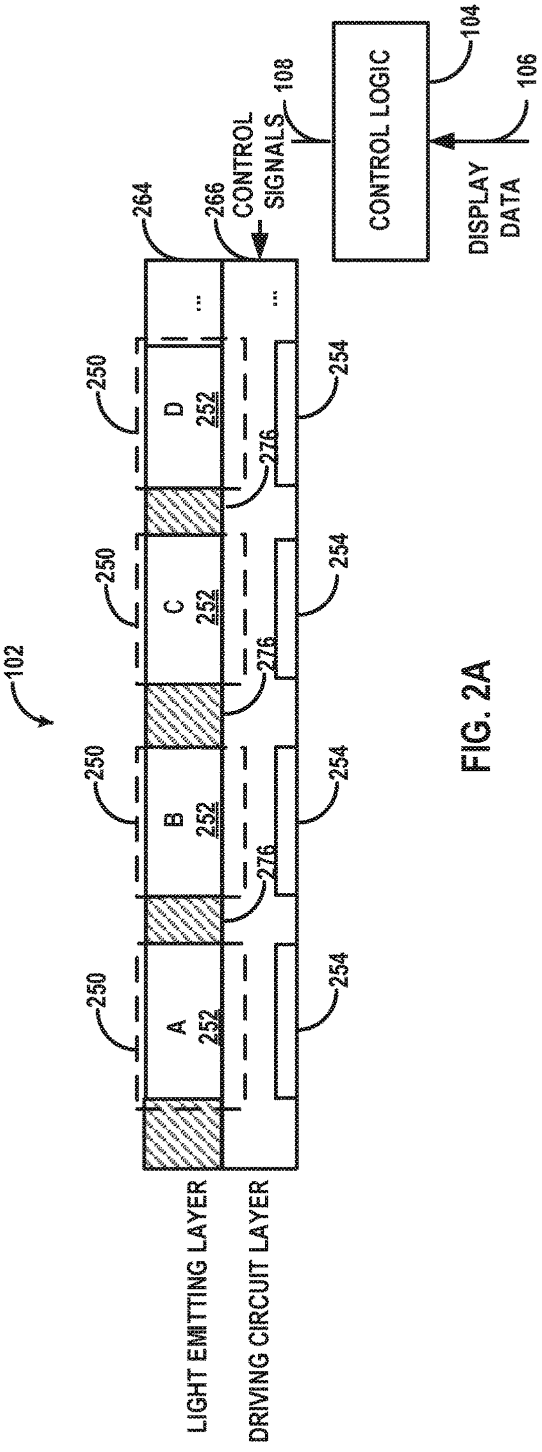
FIG. 2A is a side-view diagram illustrating an example of the display shown in FIG. 1 in accordance with an implementation.

FIG. 2A is a side-view diagram illustrating one example of display panel 102 including subpixels 250. Display panel 102 may be any suitable type of display, for example, OLED displays, such as an active-matrix OLED (AMOLED) display, or any other suitable display. Display panel 102 operatively coupled to control logic 104. In this implementation, display panel 102 includes light emitting layer 264 and a driving circuit layer 266. As shown in FIG. 2A, light emitting layer 264 includes a plurality of light emitting elements (e.g., OLEDs) 252, corresponding to a plurality of subpixels 250, respectively. A, B, C, and D in FIG. 2A denote OLEDs in different colors, such as but not limited to, red, green, blue, yellow, cyan, magenta, or white. Light emitting layer 264 also includes a black array 276 disposed between OLEDs 252, as shown in FIG. 2A. Black array 276, as the borders of subpixels 250, is used for blocking light coming out from the parts outside OLEDs 252. Each OLED 252 in light emitting layer 264 can emit light in a predetermined color and brightness based on input display information.

In this implementation, driving circuit layer 266 includes a plurality of driving circuits 254, each of which includes one or more thin film transistors (TFTs), corresponding to OLEDs 252 of subpixels 250, respectively. Driving circuits 254 may be individually addressed by control signals 108 from control logic 104 and configured to drive corresponding subpixels 250, by controlling the light emitting from respective OLEDs 252, according to control signals 108. Driving circuit layer 266 may further include one or more drivers (not shown) formed on the same substrate as driving circuits 254. The on-panel drivers may include circuits for controlling light emitting, gate scanning, and data writing as described below in detail. Scan lines and data lines are also formed in driving circuit layer 266 for transmitting scan signals and data signals, respectively, from the drivers to each driving circuit 254. Display panel 102 may include any other suitable component, such as one or more glass substrates, polarization layers, or a touch panel (not shown). Driving circuits 254 and other components in driving circuit layer 266 in this implementation are formed on a low temperature polycrystalline silicon (LTPS) layer deposited on a glass substrate, and the TFTs in each driving circuit 254 may be p-type transistors (e.g., PMOS LTPS-TFTs), n-type transistors (e.g., NMOS LTPS-TFTs), or complementary transistors, (e.g., CMOS LTPS-TFTs). In some implementations, the components in driving circuit layer 266 may be formed on an amorphous silicon (a-Si) layer, and the TFTs in each driving circuit may be n-type transistors (e.g., NMOS TFTs). In some implementations, the TFTs in each driving circuit may be organic TFTs (OTFT) or indium gallium zinc oxide (IGZO) TFTs.

As shown in FIG. 2A, each subpixel 250 is formed by at least an OLED 252 driven by a corresponding driving circuit 254. Each OLED may be formed by a sandwich structure of an anode, an organic light-emitting layer, and a cathode. Depending on the characteristics (e.g., material, structure, etc.) of the organic light-emitting layer of the respective OLED, a subpixel may present a distinct color and brightness. Each OLED 252 in this implementation is a top-emitting OLED. In some implementations, the OLED may be in a different configuration, such as a bottom-emitting OLED. In one example, one pixel may consist of three subpixels, such as subpixels in the three primary colors (red, green, and blue) to present a full color. In another example, one pixel may consist of four subpixels, such as subpixels in the three primary colors (red, green, and blue) and the white color. In still another example, one pixel may consist of two subpixels. For example, subpixels A and B may constitute one pixel, and subpixels C and D may constitute another pixel. Here, since display data 106 is usually programmed at the pixel level, the two subpixels of each pixel or the multiple subpixels of several adjacent pixels may be addressed collectively by sub-pixel rendering (SPR) to present the appropriate brightness and color of each pixel, as designated in display data 106 (e.g., pixel data). It is to be appreciated that, in some implementations, display data 106 may be programmed at the subpixel level such that display data 106 can directly address individual subpixel without SPRs. Because it usually requires three primary colors to present a full color, specifically designed subpixel arrangements may be provided for display panel 102 in conjunction with SPR algorithms to achieve an appropriate apparent color resolution.

Figure 2B:
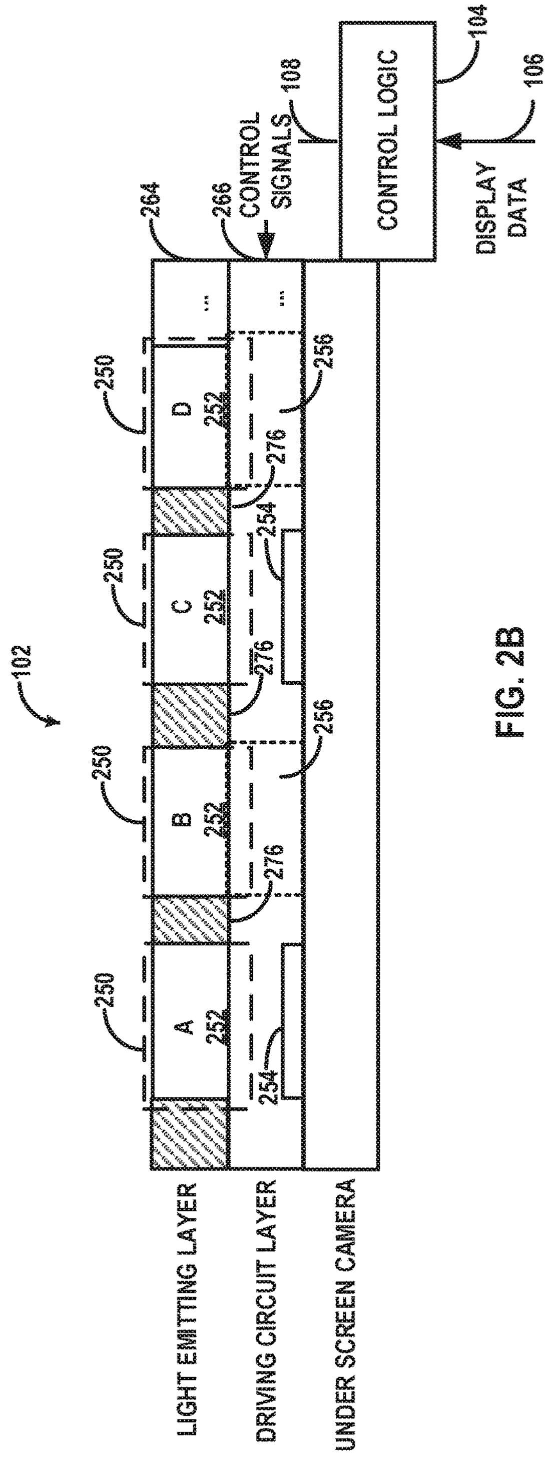
FIG. 2B is a side-view diagram illustrating an example of the display shown in FIG. 1 with an under-display camera in accordance with an implementation.

FIG. 2B is a side-view diagram illustrating an example of the display shown in FIG. 1 with a UDC. UDC is available in electronic devices with a full-screen display, which helps front cameras to produce images even after being placed behind the display. A small cut-out region of the display panel for a UDC that goes over the camera is light transmitting and employs a different structure comparing to a primary region of a display panel. As discussed above, OLEDs 252 of light emitting layer 264 are light transmitting, driving circuits 254 of the driving circuit layer 266 are light impervious, thus it is necessary to remove part of, not all of, the driving circuits 254 with through holes 256 for light to pass through and reach the camera, as shown in FIG. 2B. In the cut-out region, the one-by-one correspondence between the OLED 252 and the driving circuits 254 in FIG. 2A is broken because the remaining driving circuits 254 are fewer than the OLED 252. A different rendering method is required for this cut-out region to enable each of the remaining driving circuits 254 to control more than one light emitting element. The more driving circuits 254 have been removed, the higher the light transmission, and the more subpixels to control for each remaining driving circuits 254. Thus, the distribution of the through holes 256 needs to be carefully designed to balance the aperture ratio and the driving capability. FIG. 2B illustrates an example of the structure of the cut-out region above the UDC, in which any two adjacent driving circuits 254 are separated by a through hole 256 between them, i.e., the one-by-one correspondence is removed by a two-by-one correspondence. In other implementations, other correspondences, such as three-by-one, four-by-one, or six-by-one are provided to fulfill the requirements of the UDC and the display panel.

Figure 3:
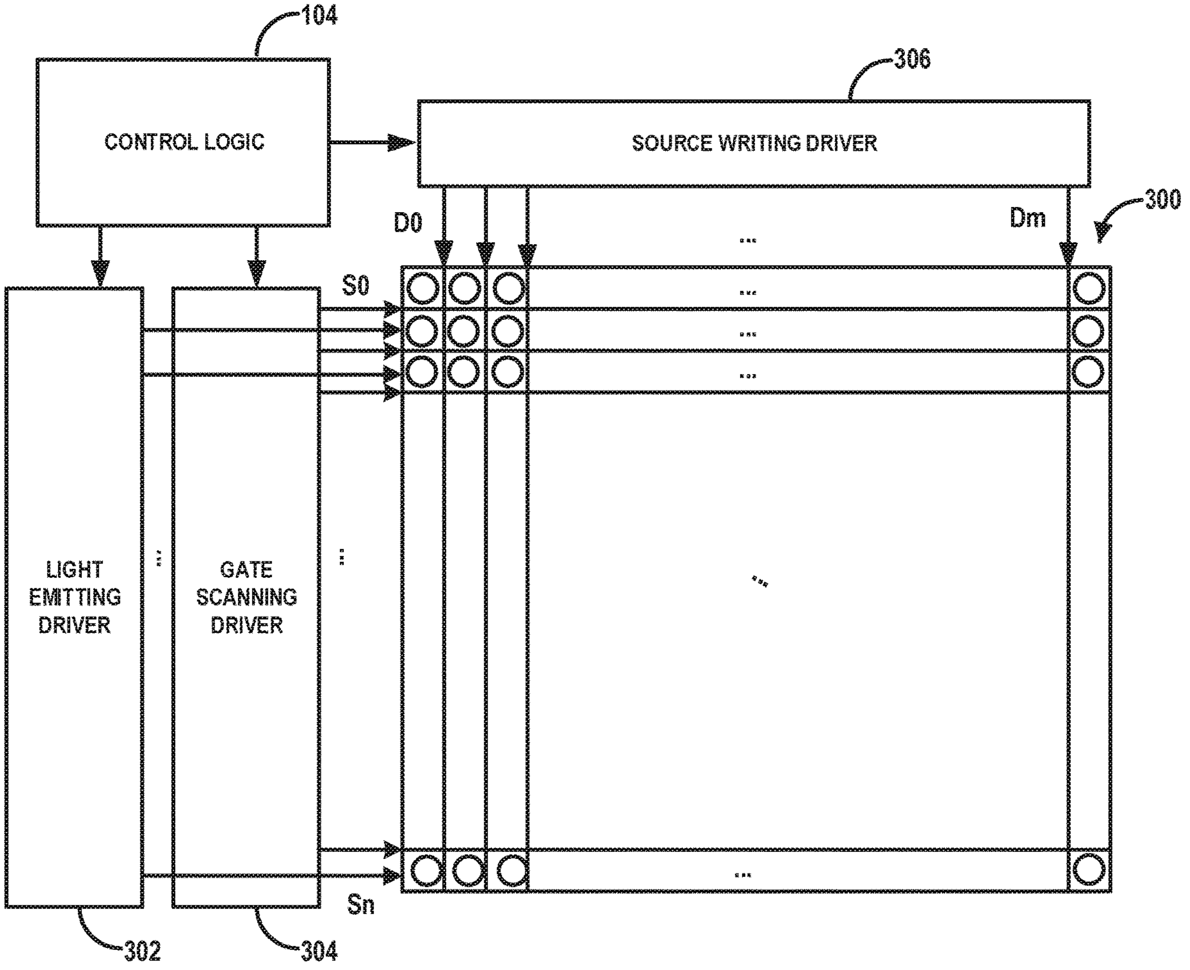
FIG. 3 is a plan-view diagram illustrating the display shown in FIG. 1 including multiple drivers in accordance with an implementation.

FIG. 3 is a plan-view diagram illustrating driving units 103 shown in FIG. 1 including multiple drivers in accordance with an implementation. Display panel (e.g., 210 or 260) in this implementation includes an array of subpixels 300, a plurality of driving circuits (not shown), and multiple on-panel drivers including a light emitting driver 302, a gate scanning driver 304, and a source writing driver 306. The driving circuits are operatively coupled to array of subpixels 300 and on-panel drivers 302, 304, and 306. Light emitting driver 302 in this implementation is configured to cause array of subpixels 300 to emit lights in each frame. It is to be appreciated that although one light emitting driver 302 is illustrated in FIG. 3, in some implementations, multiple light emitting drivers may work in conjunction with each other.

Gate scanning driver 304 in this implementation applies a plurality of scan signals S0-Sn, which are generated based on control signals 108 from control logic 104, to the scan lines (a.k.a. gate lines) for each row of subpixels in array of subpixels 300 in a sequence. The scan signals S0-Sn are applied to the gate electrode of a switching transistor of each driving circuit during the scan/charging period to turn on the switching transistor so that the data signal for the corresponding subpixel can be written by source writing driver 306. As will be described below in detail, the sequence of applying the scan signals to each row of array of subpixels 300 (i.e., the gate scanning order) may vary in different implementations. In some implementations, not all the rows of subpixels are scanned in each frame. It is to be appreciated that although one gate scanning driver 304 is illustrated in FIG. 3, in some implementations, multiple gate scanning drivers may work in conjunction with each other to scan array of subpixels 300.

Source writing driver 306 in this implementation is configured to write display data received from control logic 104 into array of subpixels 300 in each frame. For example, source writing driver 306 may simultaneously apply data signals DO-Dm to the data lines (a.k.a. source lines) for each column of subpixels. That is, source writing driver 306 may include one or more shift registers, digital-analog converter (DAC), multiplexers (MUX), and arithmetic circuit for controlling the timing of application of voltage to the source electrode of the switching transistor of each driving circuit (i.e., during the scan/charging period in each frame) and a magnitude of the applied voltage according to gradations of display data 106. It is to be appreciated that although one source writing driver 306 is illustrated in FIG. 3, in some implementations, multiple source writing drivers may work in conjunction with each other to apply the data signals to the data lines for each column of subpixels.

Figure 4:
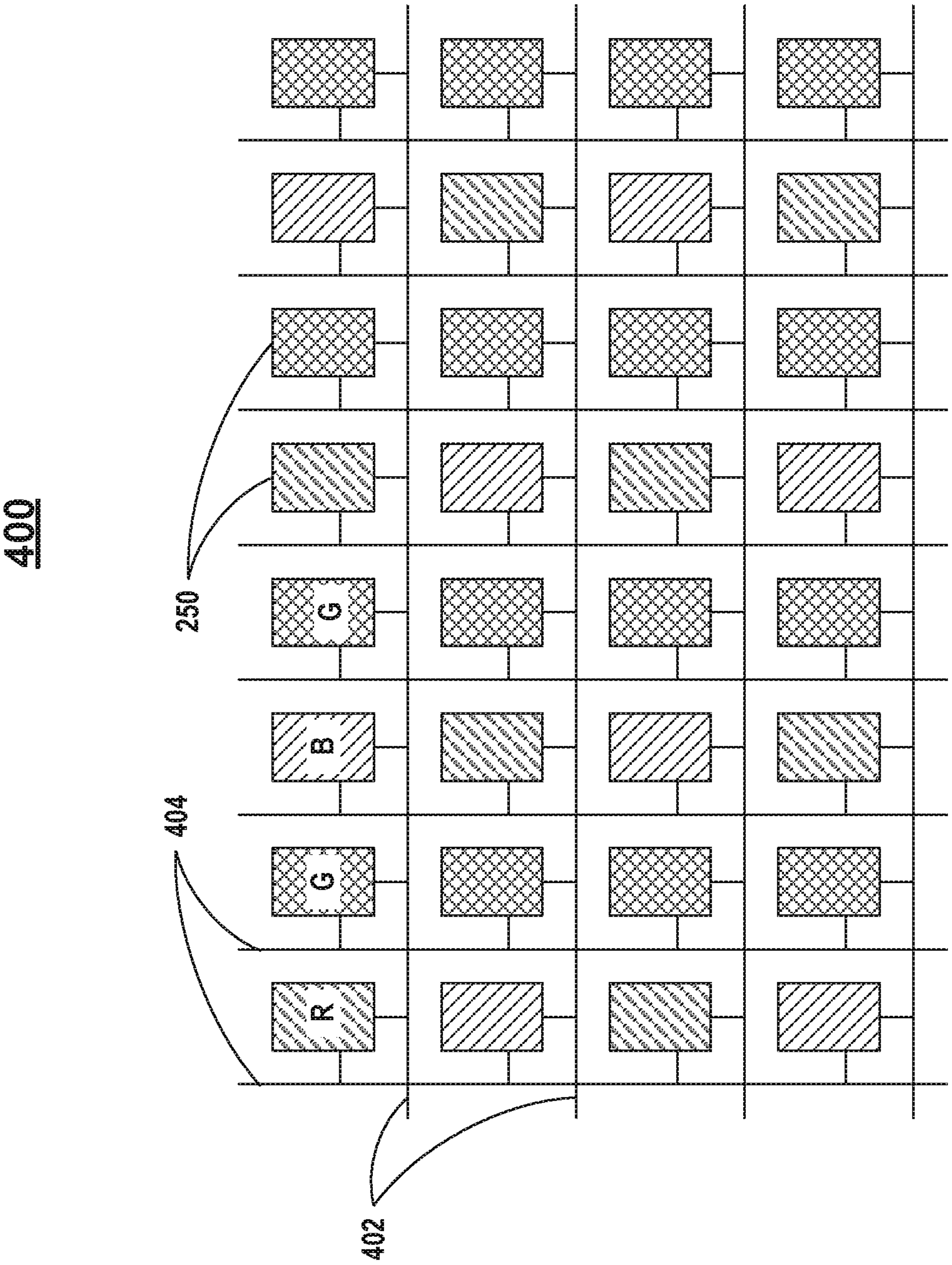
FIG. 4 is a block diagram illustrating a correspondence between subpixels and driving units of the display in FIG. 2A in accordance with an implementation.

FIG. 4 is a block diagram illustrating a correspondence between subpixels and driving units of the display in FIG. 2A in accordance with an implementation in which the light emitting elements (i.e., subpixels) correspond to the driving units one by one. Display panel 400 includes an orthogonal matrix consisting by a plurality of gate lines 402 and a plurality of source lines 404. The subpixels 250 are arranged in the orthogonal matrix, and each subpixel 250 is controlled by a gate line 402 and a source line 404 independently. The subpixels are divided into red subpixels, green subpixels, and blue subpixels based on the color of the subpixel. The three types of subpixels are arranged based on Pentile arrangement. In this implementation, RGBG matrix is employed.

Pentile matrix arrangement is a sub-pixel design architecture family. The basic Pentile structure is the RGBG matrix. In RGBG Pentile display panels, there are only two subpixels per pixel, with twice as many green pixels as red and blue ones. Pentile arrangement is designed based on human eye mechanism, the green subpixel keeps main portion of luminance, which is more sensitive to human eye than chromaticity is. Therefore, half reducing the quantity of red and blue subpixels would barely reduce the image quality. Another Pentile structure is Diamond matrix, there are twice as many green subpixels as there are blue and red ones, and the green subpixels are oval and small, while the red and blue ones are diamond-shaped and larger. The diamond shapes were chosen to maximize the sub-pixel packing and achieve the highest possible pixels per inch (PPI). The greens are oval because they are squeezed between the larger red and blue ones. Pentile structure increases the lifetime of OLED panels. A blue OLED has the lowest luminous efficiency (lower than red and green), and so needs to be driven at a higher current—which means a lower lifetime. The Pentile arrangement comprises half the amount of red and blue subpixels than normal display do, which enables larger sub-pixels and reduces the current density required to achieve a given luminance—which improves lifetime. The present disclosure can be used in any type of display panel with a UDC integrated. The Pentile structures described herein are for illustrative purposes only and should not be interpreted as a limitation of the present disclosure.

Figure 5A:
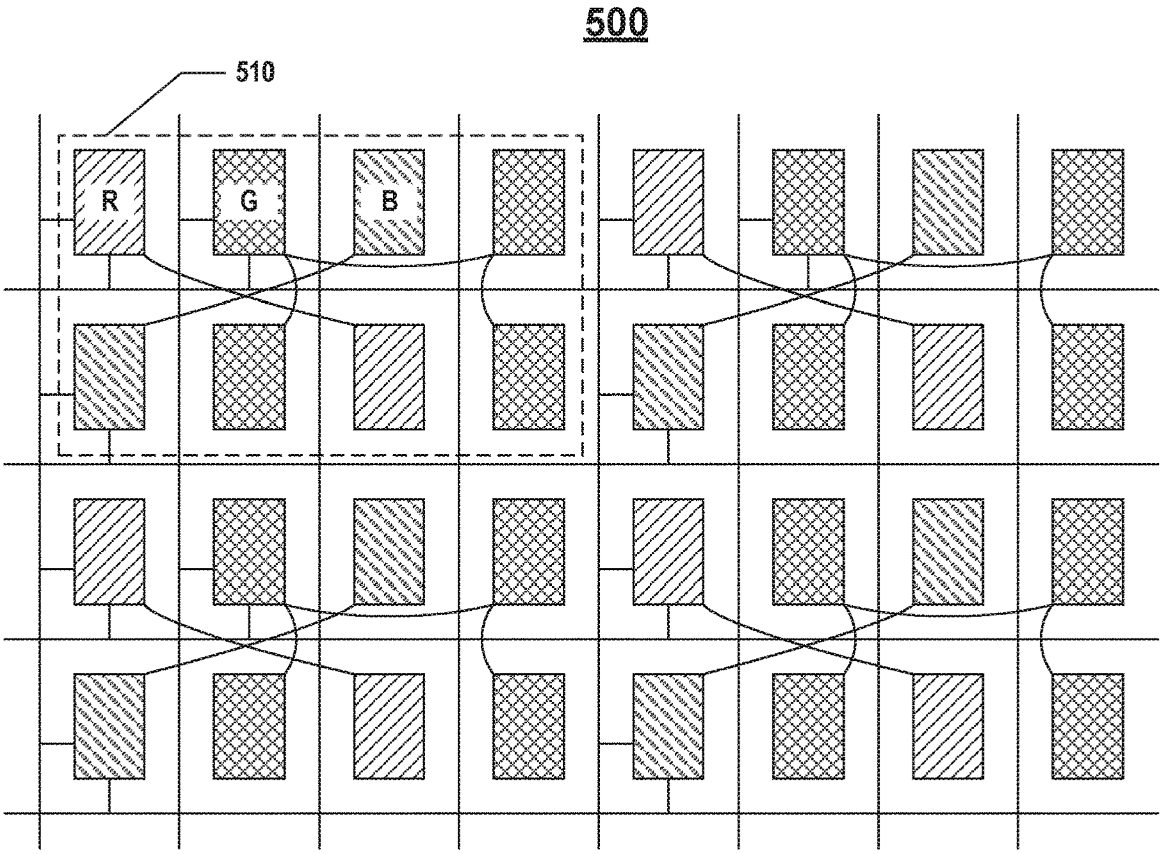
FIG. 5A is a block diagram illustrating a correspondence between subpixels and driving units of the display in FIG. 2B in accordance with an implementation.
Figure 5B:
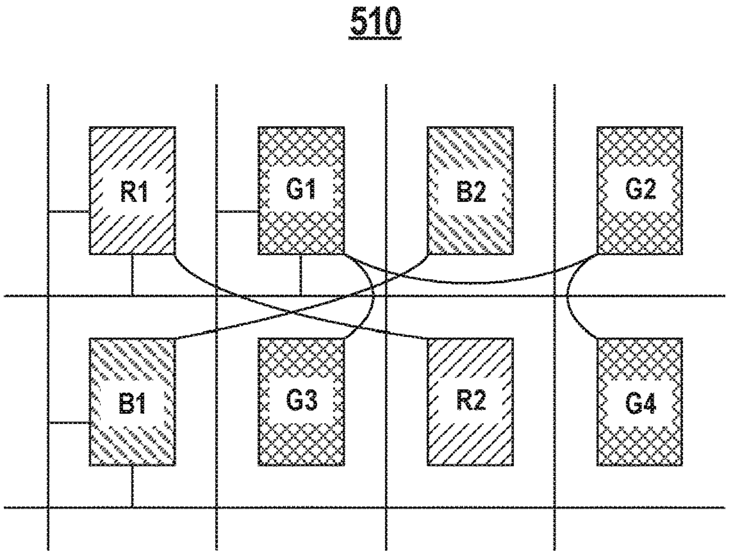
FIG. 5B is an enlarged block diagram of part of FIG. 5A.

FIG. 5A shows a cut-out region 500 of a display penal above the UDC. The arrangement of the subpixels, the gate lines, and the sources are the same as the ones in FIG. 4. The difference between FIG. 4 and FIG. 5A lies on the correspondence between OLEDs and driving circuits. In the cut-out region of the display panel above the UDC, a large number of compensation circuits and TFTs were removed to improve the aperture ratio, and subpixels driven by the removed compensation circuits and TFTs cannot be driven directly. Instead, they can be driven indirectly by electrically connected with other subpixels. FIG. 5B is a partially enlarged block diagram of a region 510 in FIG. 5A. The subpixels of a display panel are arranged repeatedly according to a certain pattern, and region 510 shows an arrangement of subpixels within a repeating module. In FIG. 5B, red subpixel R1, green subpixel G1, and blue subpixel B1 directly connect to and driven by the gate lines and source lines. Red subpixel R2 does not connect to any gate line or source line directly. By electrically connecting to red subpixel R1, red subpixel R2 can share a same driving signal with red subpixel R1. Similarly, blue subpixel B2 shares a same driving signal with blue subpixel B1, and green subpixels G2, G3, and G4 share a same driving signal with green subpixel G1. The correspondence between the red subpixels and the driving circuits is two by one, the correspondence between the blue subpixels and the driving circuits is two by one, and the correspondence between the green pixels and the driving circuits is four by one.

Figure 6:
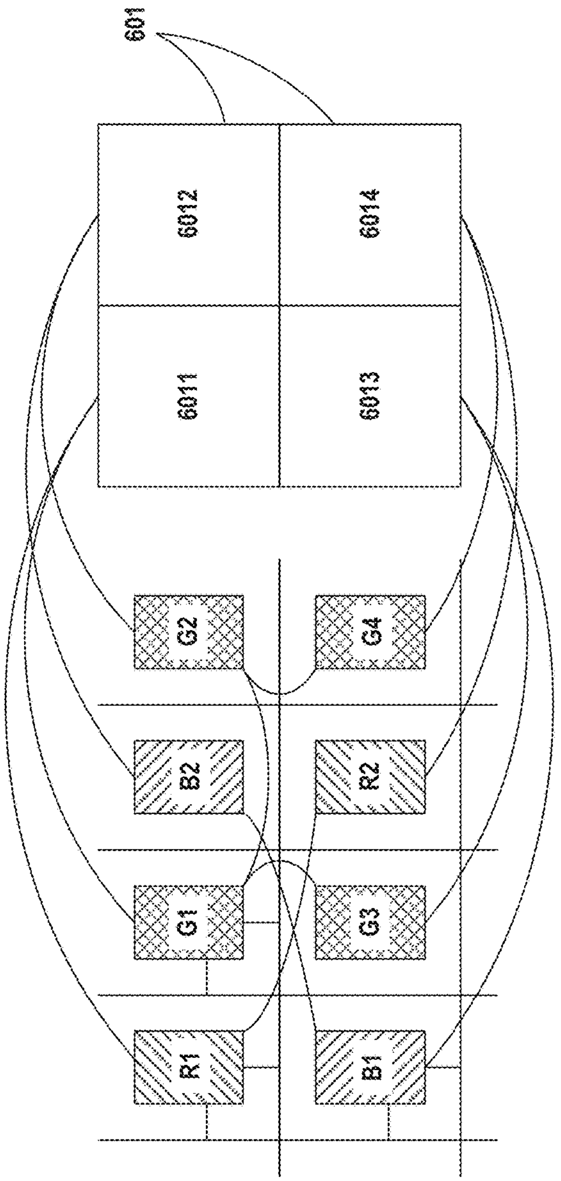
FIG. 6 is a block diagram illustrating the correspondence between the subpixels in FIG. 5B and display data applied to the subpixels in accordance with an implementation.

In the arrangement of FIGS. 5A and 5B, a pixel consists of two adjacent subpixels in a same row, and two subpixels from two adjacent rows share a same control signal. Thus, the repeating module of subpixels is a 2×4 matrix, and the repeating module of pixels is a 2×2 matrix, as shown in FIG. 6. FIG. 6 shows a correspondence between the subpixels in FIG. 5B and display data applied to the subpixels. The input display data matrix includes a first pixel 6011, a second pixel 6012, a third pixel 6013, and a fourth pixel 6014. First pixel 6011 is represented by subpixels R1 and G1, second pixel 6012 is represented by subpixels B2 and G2, third pixel 6013 is represented by subpixels B1 and G3, and fourth pixel 6014 is represented by subpixels R2 and G4.

First pixel 6011 includes three grayscale information for red, green, and blue, respectively. The blue channel is not able to be represented by the corresponding subpixels R1 and G1 because of the absence of blue subpixel in the Pentile arrangement. To represent the grayscale for the blue channel of first pixel 6011, blue subpixel B2 is "borrowed". That is, the blue subpixel B2 is not only be given a grayscale value of the blue channel of second pixel 6012, but also a grayscale value of the blue channel of first pixel 6011. Usually, an arithmetic average value of the grayscale value of the blue channel of first pixel 6011 and second pixel 6012 is taken as the grayscale value of subpixel B2. Similarly, the grayscale of red subpixel R1 is an arithmetic average value of the grayscale value of the red channel of first pixel 6011, second pixel 6012, and third pixel 6013. Further, as subpixel R2 electrically connects to and is controlled by subpixel R1, the red channel of third pixel 6013 and fourth pixel 6014 are also represented by subpixel R1.

Figure 7C:
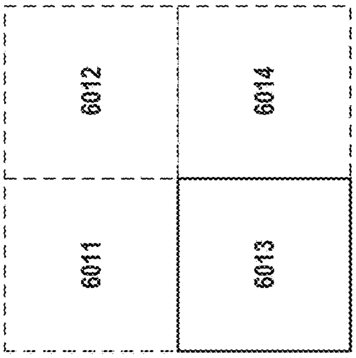
FIGS. 7A-7C are block diagrams illustrating sampling ranges for different subpixels in FIG. 6 in accordance with an implementation.
Figure 7B:
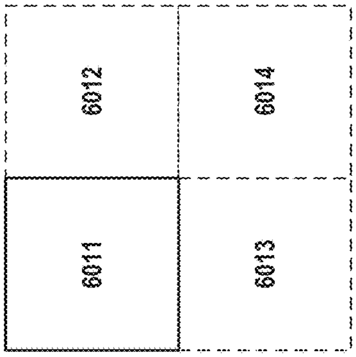
Figure 7A:
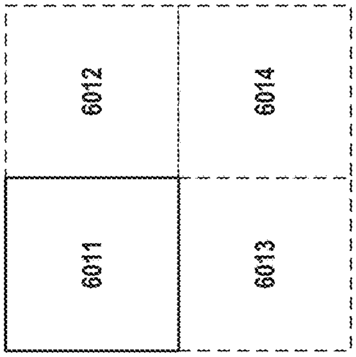

FIG. 7A is a block diagram illustrating a sampling range for red subpixel R1, in which first pixel 6011 is regarded as an anchored pixel, and the red channels of all the four pixels should be considered to get an accurate display. FIG. 7B is a block diagram illustrating a sampling range for green subpixel G1, in which first pixel 6011 is regarded as a anchored pixel and the green channels of all the four pixels should be considered because subpixels G2, G3, and G4 are all driven by subpixel G1 indirectly, and the four green subpixels share a same driving signal. FIG. 7C is a block diagram illustrating a sampling range for blue subpixel B1, in which third pixel 6013 is regarded as a anchored pixel, and the blue channels of all the four pixels should be considered because no blue pixel represents the blue channel in first pixel 6011 and fourth pixel 6014 and subpixels B2 is driven by subpixel B1 indirectly.

In the present implementation, each repeating module includes two types of sampling ranges. To render a red subpixel or a green subpixel, the corresponding pixel is considered as a anchored pixel. Besides the anchored pixel, the pixel on the right of the anchored pixel, the pixel under the anchored pixel, and the pixel to the lower right of the anchored pixel should be considered. To render a blue subpixel, the corresponding pixel is considered a anchored pixel. Besides the anchored pixel, the pixel on the right of the anchored pixel, the pixel above the anchored pixel, and the pixel to the upper right of the anchored pixel should be considered. The sampling ranges in this implementation are few and simple. In other implementations, the correspondences between subpixels (OLEDs) and driving circuits vary greatly between different types of display panels.

Figure 8:
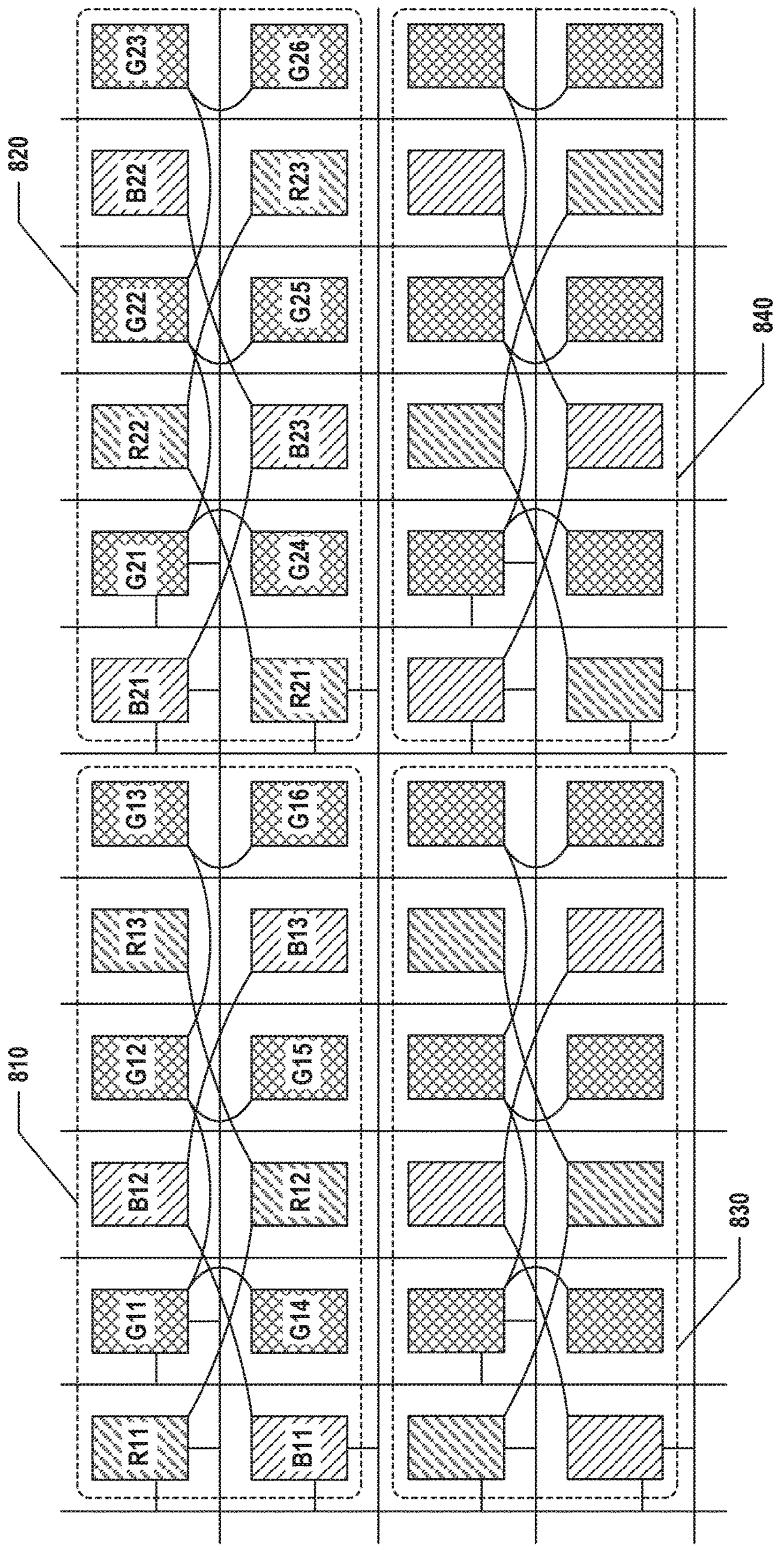
FIG. 8 is a block diagram illustrating a correspondence between subpixels and driving units of the display in FIG. 2B in accordance with an implementation.
Figure 9:
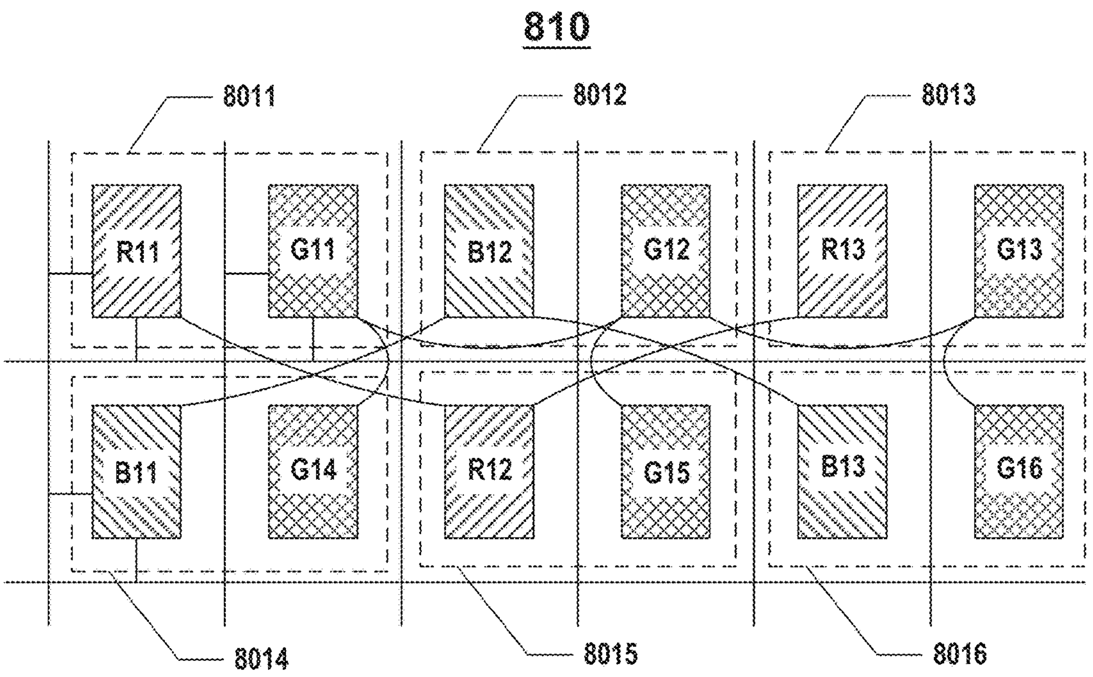
FIG. 9 is a block diagram illustrating the correspondence between part of the subpixels in FIG. 8 and a display data applied to the pixels in accordance with an implementation.
Figure 11:
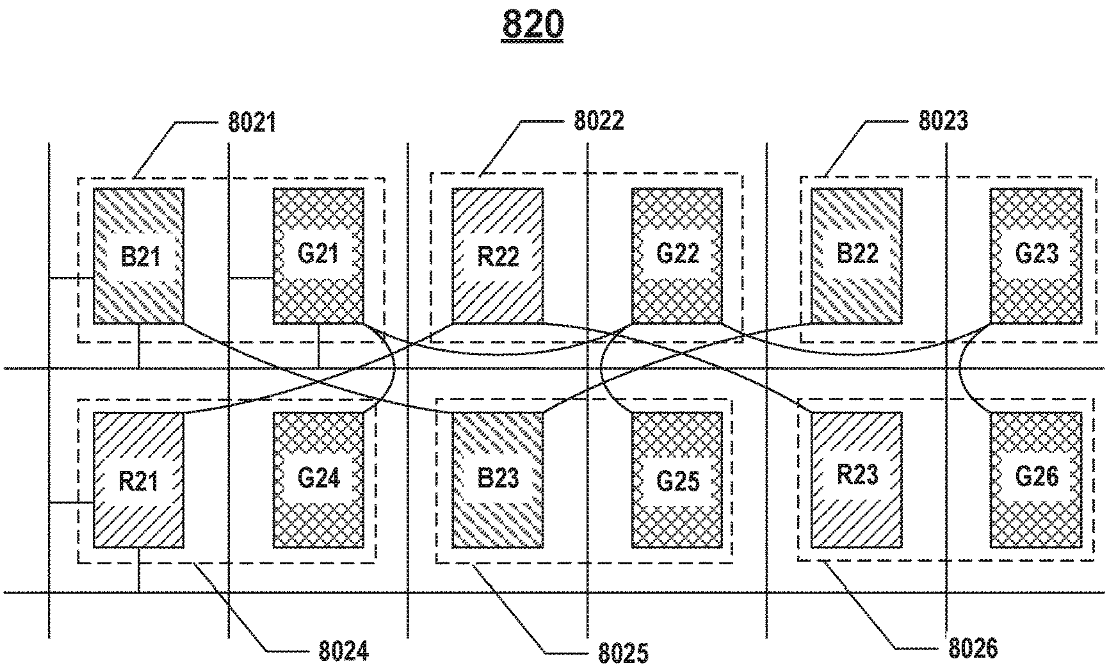
FIG. 11 is a block diagram illustrating the correspondence between part of the subpixels in FIG. 8 and a display data applied to the pixels in accordance with an implementation.

FIG. 8 is a block diagram illustrating a cut-out region of a display panel above the UDC in another implementation. The subpixels are divided into four repeating modules based on the correspondence between the subpixels and the driving circuits. A first repeating module 810 is a 2×6 matrix including twelve subpixels, a second repeating module 820 is a 2×6 matrix on the right of first repeating module 810, a third repeating module 830 is a 2×6 matrix under first repeating module 810, a fourth repeating module 840 is a 2×6 matrix under second repeating module 820. FIG. 9 and FIG. 11 are partially enlarged diagrams of first repeating module 810 and second repeating module 820.

Referring to FIG. 9, first repeating module 810 corresponds to a 2×3 matrix display data, where a first group of subpixels R11 and G11 represent a first pixel 8011, a second group of subpixels B12 and G12 represent a second pixel 8012, a third group of subpixels R13 and G13 represent a third pixel 8013, a fourth group of subpixels B11 and G14 represent a fourth pixel 8014, a fifth group of subpixels R12 and G15 represents a fifth pixel 8015, and a sixth group of subpixels B13 and G16 represent a sixth pixel 8016. FIG. 9 shows an arrangement of subpixels within first repeating module 810. Red subpixel R11, green subpixel G11, and blue subpixel B11 directly connect to and driven by the gate lines and source lines. Red subpixels R12 and R13 do not connect to any gate line or source line directly. By electrically connected to red subpixel R11, red subpixels R12 and R13 can share a same driving signal with red subpixel R11. Similarly, blue subpixels B12 and B13 share a same driving signal with blue subpixel B11, green subpixels G12, G13, G14, G15, and G16 share a same driving signal with green subpixel G11. The correspondence between the red subpixels and the driving circuits is three by one, the correspondence between the blue subpixels and the driving circuits is three by one, and the correspondence between the green pixels and the driving circuits is six by one.

Taking subpixel R1 as an example. First pixel 8011 includes three grayscale information for red, green, and blue, respectively. The blue channel is not able to be represented by the corresponding subpixels R11 and G11 because of the absence of blue subpixel in the Pentile arrangement. To represent the grayscale for blue channel of first pixel 8011, the blue subpixel B12 is "borrowed", that is, blue subpixel B12 is not only given a grayscale value of the blue channel of second pixel 8012, but also a grayscale value of the blue channel of first pixel 8011. Usually, an arithmetic average value of grayscale value of the blue channel of first pixel 8011 and second pixel 8012 is taken as the grayscale value of subpixel B12. Similarly, as subpixel R12 electrically connects to and is controlled by subpixel R11, the grayscale of red subpixel R11 is an arithmetic average value of grayscale value of the red channel of first pixel 8011, second pixel 8012, third pixel 8013, fourth pixel 8014, fifth pixel 8015, and sixth pixel 8016.

Figure 10A:
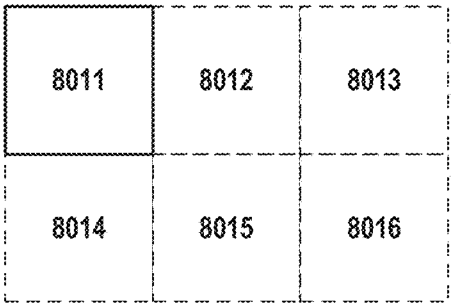
FIGS. 10A-10C are block diagrams illustrating sampling ranges for different subpixels in FIG. 9 in accordance with an implementation.
Figure 10B:
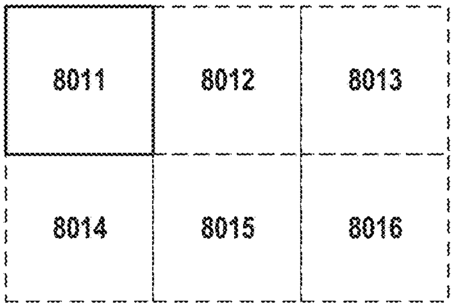
Figure 10C:
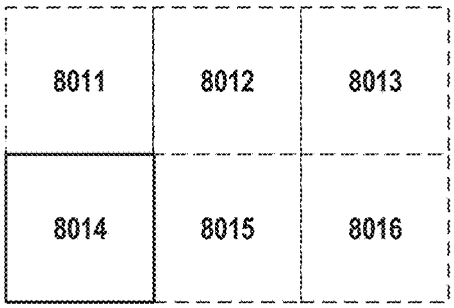

FIG. 10A is a block diagram illustrating a sampling range for red subpixel R11, in which the red channels of all the six pixels should be considered to get an accurate display. FIG. 10B is a block diagram illustrating a sampling range for green subpixel G11, in which the green channels of all the six pixels should be considered because subpixels G12, G13, G13, G14, and G15 are all driven by subpixel G11 indirectly, and the six green subpixels share a same driving signal. FIG. 10C is a block diagram illustrating a sampling range for blue subpixel B11, in which the blue channels of all the six pixels should be considered because no blue pixel to represent the blue channels in first pixel 8011, third pixel 8013, and fifth pixel 8015, and subpixels B12 and B13 are driven by subpixel B11 indirectly.

In the present implementation, the repeating module includes two types of sampling ranges. To render a subpixel within the repeating module, the corresponding pixel is considered a anchored pixel. Besides the anchored pixel, the two pixels on the right of the anchored pixel, the pixel under the anchored pixel, and the two pixels to the lower right of the anchored pixel should be considered. To render a subpixel, the corresponding pixel is considered as a anchored pixel. Besides the anchored pixel, the two pixels on the right of the anchored pixel, the pixel above the anchored pixel, and the two pixels to the upper right of the anchored pixel should be considered.

FIG. 11 illustrates second repeating module 820 corresponding to a 2×3 matrix display data, where a seventh group of subpixels B21 and G21 represent a seventh pixel 8021, an eighth group of subpixels R22 and G22 represent an eight pixel 8022, a ninth group of subpixels B22 and G23 represent a ninth pixel 8023, a tenth group of subpixels R21 and G24 represent a tenth pixel 8024, an eleventh group of subpixels B23 and G25 represent an eleventh pixel 8025, and a twelfth group of subpixels R23 and G26 represent a twelfth pixel 8026. FIG. 11 shows an arrangement of subpixels within second repeating module 820. Blue subpixel B21, green subpixel G21, and red subpixel R21 directly connect to and driven by the gate lines and source lines. Red subpixels R22 and R23 do not connect to any gate line or source line directly. By electrically connected to red subpixel R21, red subpixels R22 and R23 can share a same driving signal with red subpixel R21. Similarly, blue subpixels B22 and B23 share a same driving signal with blue subpixel B21, green subpixels G22, G23, G24, G25, and G26 share a same driving signal with green subpixel G21. The correspondence between the red subpixels and the driving circuits is three by one, the correspondence between the blue subpixels and the driving circuits is three by one, and the correspondence between the green pixels and the driving circuits is six by one.

Taking subpixel B21 as an example. Seventh pixel 8021 includes three grayscale information for red, green, and bule, respectively. The red channel is not able to be represented by the corresponding subpixels B21 and G21 because of the absence of red subpixel in the Pentile arrangement. To represent the grayscale for red channel of seventh pixel 8021, the red subpixel R22 is "borrowed", that is, the red subpixel R22 is not only given a grayscale value of the red channel of eighth pixel 8022, but also a grayscale value of the red channel of seventh pixel 8021. Usually, an arithmetic value of grayscale value of the red channel of seventh pixel 8021 and eighth pixel 8022 is taken as the grayscale value of subpixel R22. Similarly, as subpixel B22 electrically connects to and is controlled by subpixel B21, the grayscale of blue subpixel B21 is an arithmetic average value of grayscale value of the blue channel of seventh pixel 8021, eighth pixel 8022, ninth pixel 8023, tenth pixel 8024, eleventh pixel 8025, and twelfth pixel 8026.

Figure 12A:
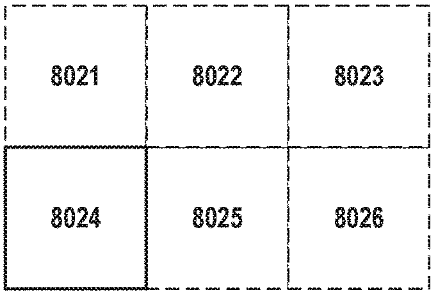
FIGS. 12A-12C are block diagrams illustrating sampling ranges for different subpixels in FIG. 9 in accordance with an implementation.
Figure 12B:
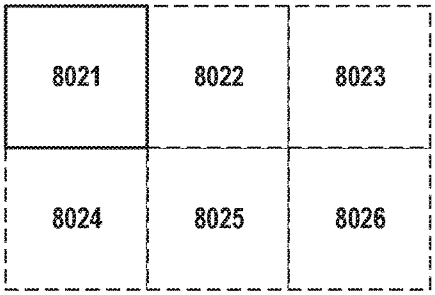
Figure 12C:
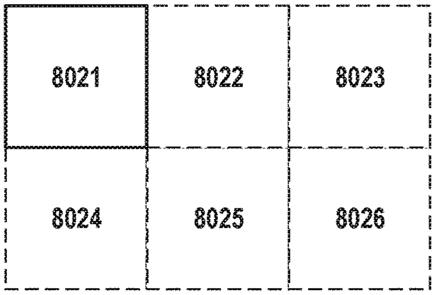

FIG. 12A is a block diagram illustrating a sampling range for red subpixel R21, in which the red channels of all the six pixels should be considered to get an accurate display. FIG. 12B is a block diagram illustrating a sampling range for green subpixel G21, in which the green channels of all the six pixels should be considered because subpixels G22, G23, G23, G24, and G25 are all driven by subpixel G21 indirectly, and the six green subpixels share a same driving signal. FIG. 12C is a block diagram illustrating a sampling range for blue subpixel B21, in which the blue channels of all the six pixels should be considered because no blue subpixel to represent the red channels in seventh pixel 8021, and ninth pixel 8023, and subpixels R22 and R23 are driven by subpixel R21 indirectly. In this implementation, the repeating module also includes two types of sampling ranges.

The difference between first repeating module 810 and second repeating module 820 is the changes in relative positions of a anchored subpixel for a same position. For example, in first repeating module 810, the anchored pixel for red channel is first pixel 8011. Referring to FIG. 10A, the corresponding pixels which should be considered include: the two pixels on the right of first pixel 8011, the pixel under first pixel 8011, and the two pixels to the lower right of first pixel 8011. In the second repeating module 820, the anchored pixel for red channel is seventh pixel 8021. Referring to FIG. 12A, the corresponding pixels which should be considered include: the two pixels on the right of seventh pixel 8021, the pixel above seventh pixel 8021, and the two pixels to the upper right of seventh pixel 8021. Therefore, the sampling range of red subpixel R11 within first repeating module 810 is different from that of red subpixel R21 within second repeating module 820. The rendering methods and sampling ranges of subpixels in the same color are different and should be carefully designed. In addition, rendering methods of subpixels in different channels of a same display panel can be the same or different, which are determined by the types of display panel. In practice, different manufacturers employ different designs and circuits to balance the aperture ratio and display effect. Thus, the rendering method as well as sampling strategy varies among different types of display panels. Once switched to a different panel, the corresponding method and strategy need to be re-designed. Given that the method and strategy are actually integrated in control logic 104, this re-design behavior may introduce a large workload and duplicate cost.

Figure 13:
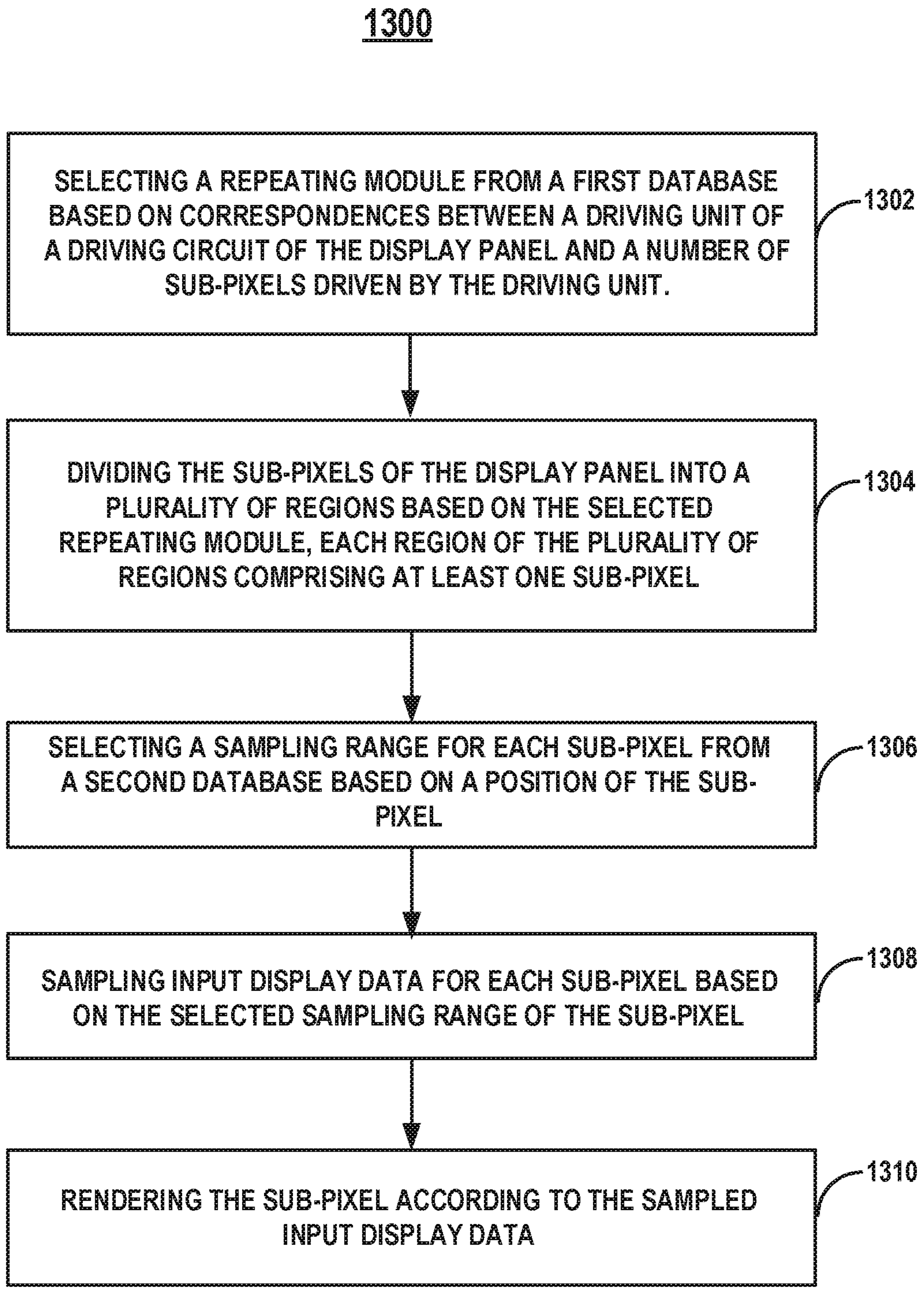
FIG. 13 is a depiction of an exemplary method for rendering a region of a display panel above an under-display camera in accordance with an implementation.

FIG. 13 illustrates a flow chart of a method 1300 for rendering subpixels of a display panel. It will be described with reference to the above figures. Any suitable circuit, logic, unit, module, or sub-module may be employed. The method can be performed by any suitable circuit, logic, unit, module, or sub-module that can comprise hardware (e.g., circuitry, dedicated logic, programmable logic, microcode, etc.), software (e.g., instructions executing on a processing device), firmware, or a combination thereof. In some implementations, operations 1302-1310 of method 1300 may be performed in various orders. In an example, operations 1302-1310 may be performed sequentially, as shown in FIG. 13. In another example, operations 1302-1306 may be performed at the same time, and operations 1308 and 1310 may be performed sequentially after operations 1302-1306. The orders of the operations should not be limited to the implementations of the present disclosure.

Figure 14:
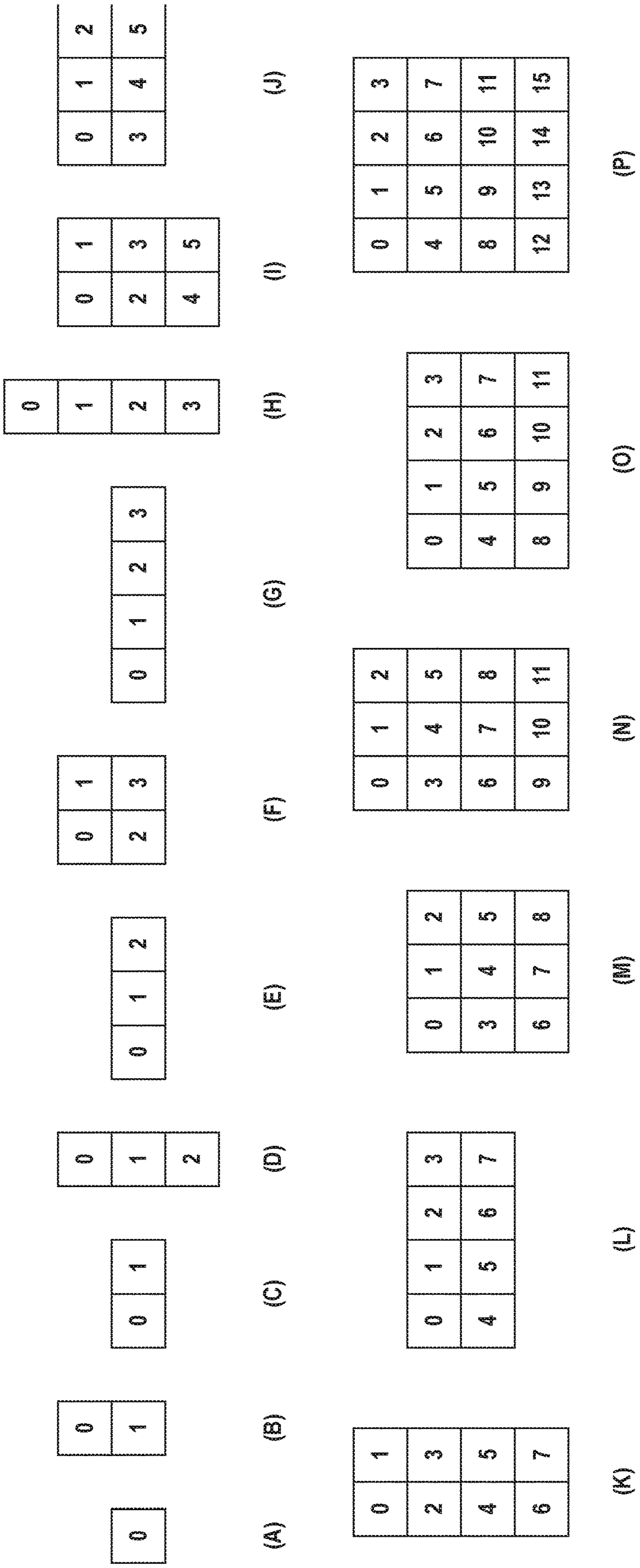
FIG. 14 includes block diagrams illustrating repeating modules for different correspondences between subpixels and driving units in accordance with an implementation.

Starting at operation 1302, a repeating module is selected from a first database based on correspondences between a driving unit of a driving circuit of the display panel and a number of subpixels driven by the driving unit. The correspondences are determined by the type of the display panel and are fixed after production. The first database includes a plurality of pre-stored repeating modules corresponding to different types of display panels, as shown in FIG. 14. Each repeating module includes at least one block, and each block represent a different sampling strategy. Numbers shown in each block represent an identification number of each sampling strategy. In the present example, in diagram (A), only one block is included in repeating module 14A, which means all the subpixels in the display panel employ a same sampling strategy. In diagram (P), repeating module 14P includes sixteen blocks, and the number in each block differs from numbers of other blocks, which means the sixteen subpixels in repeating module 14P employs sixteen different sampling strategies. In the present implementation, a minimal number of the blocks in the repeating modules is one, as shown in diagram (A); a maximal number of the blocks in the repeating modules is sixteen, as shown in diagram (P). The more complex the UDC region is, the more sampling strategies should be employed to gain a better display effect.

At the same time, the driving ability of each driving circuit would be decreased as the increase of the complexity, thus no more than sixteen sampling strategies are included in the present implementation. It is to be appreciated that the numbers provided in FIG. 14 are for an exemplary purpose only and without limitations.

Then proceeds to operation 1304. After the correspondences are determined, the subpixels of the display panel are divided into a plurality of regions based on the selected repeating module. Referring to FIG. 5A, the correspondences in FIG. 5A are two by one and three by one, and a minimal repeating module based on the correspondences includes eight subpixels, as region 510 shown in FIGS. 5A and 5B. Each repeating module in FIG. 5A includes eight positions. Similarly, the correspondences in FIG. 8 are three by one and six by one, and a minimal repeating module based on the correspondences includes twelve subpixels, as first repeating module 810 and second repeating module 820 shown in FIGS. 9 and 11. Each repeating module in FIG. 8 includes eight positions. The subpixels in the display panel are divided into a plurality of regions based on the selected repeating module.

Figure 15:
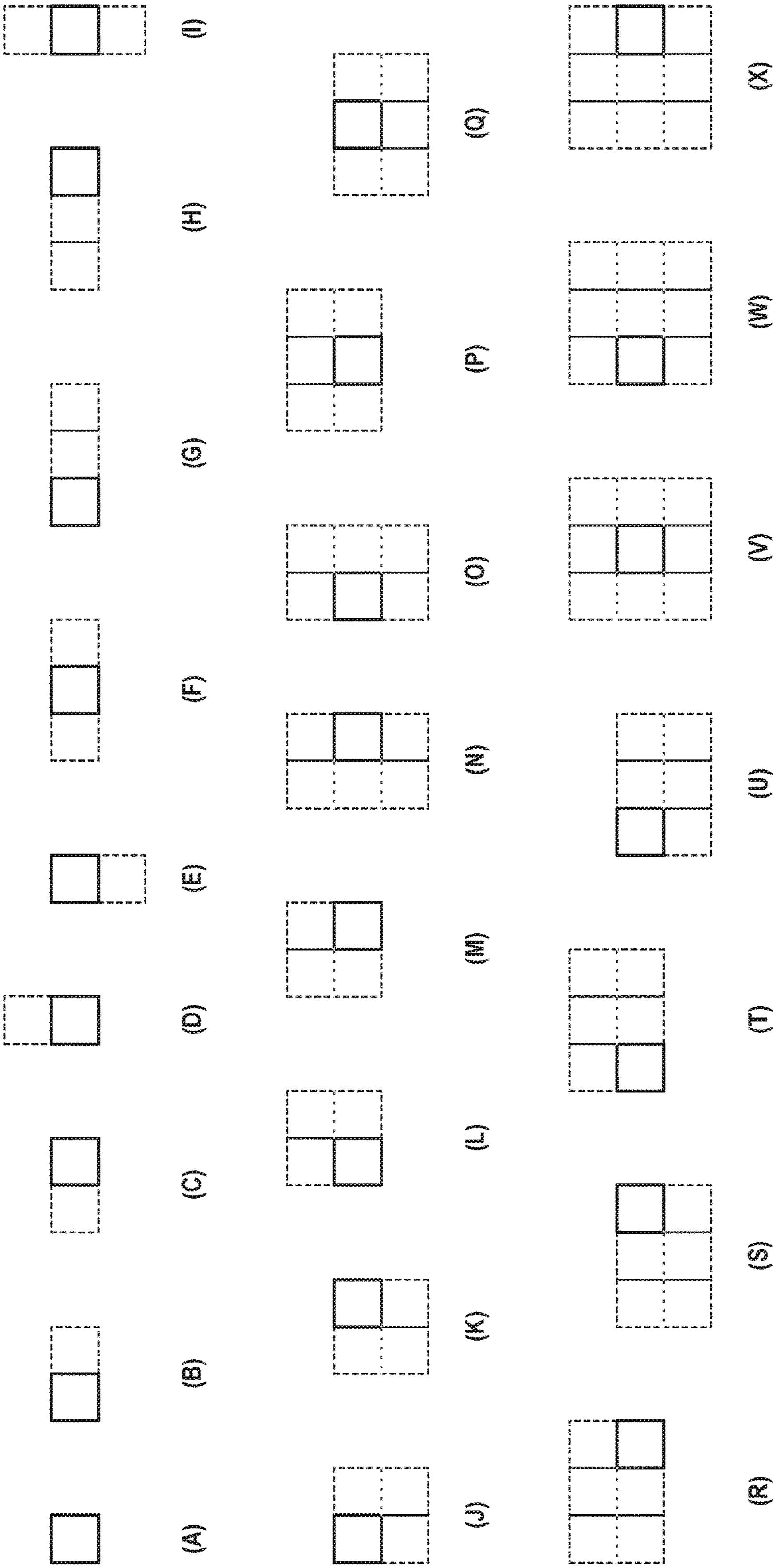
FIG. 15 includes block diagrams illustrating sampling ranges for different subpixels in different positions of different repeating modules in accordance with an implementation.

At operation 1306, a sampling range is selected for each subpixel from a second database based on the position of the subpixel. Referring to FIG. 15, the second database includes a plurality of pre-stored sampling ranges corresponding to a plurality of positions in a plurality of repeating modules. As shown in FIG. 15, each sampling range includes a anchored subpixel as a location of the anchored subpixel corresponds to a location where the display information input. Each sampling range further includes a plurality of peripheral subpixels around the anchored subpixel. When the sampling range is resigned to a subpixel, the subpixel is placed as the anchored subpixel. For example, in repeating module 14A, only one sampling strategy should be picked for all the subpixels within the UDC region; while in repeating module 14F to 14G, four sampling strategies should be picked for all the subpixels within the UDC region. It should be understood that the number in each block is used to distinguish the sampling strategy in the block from the sampling strategies in other blocks, thus block 0 in repeating module 14F and block 0 in repeating module 14G can employ any sampling strategies, as long as they differ from other blocks.

Firstly, as being limited by the capability of data processing of the controller of the display panel, the distance between a peripheral subpixel and the anchored subpixel is limited, such as smaller than two subpixels. At most two subpixels are placed between a anchored subpixel and the peripheral subpixel along both a vertical direction and a horizontal direction, as shown in FIG. 15. With the development of the technology, the distance can be expanded when the capability of data processing of the controller of the display panel improved. The display data input into the display panel is continuous and processed in order, i.e., subpixels in a first row will be input and processed before a second row below the first row.

In the vertical direction, the pixels for sampling a subpixel should be limited within two adjacent rows. Referring to FIG. 8, assuming there are 48 subpixels in display panel 800, the display data will be input in an order corresponding to the arrangement of the subpixels. That is, the pixels corresponding to subpixels in the first row, i.e., subpixels from R11 to G23, will be input first, and the pixels corresponding to subpixels in the second row, i.e., subpixels from B11 to G26, will be input afterwards. Taking blue subpixel B11 as an example, the first pixel 8011 to sixth pixel 8016 should be considered to render subpixel B11, and display data of all the five pixels between subpixel R11 and subpixel B11 should be saved for rendering subpixel B11. In practice, there are more than thousands of the subpixels in a same row of a display panel. Each additional row of subpixels to be considered at the same time requires exponentially more storage. Thus, in the present implementation, it is better to limit the sampling range within adjacent rows.

In the horizontal direction, the sampling a subpixel should be limited within three adjacent columns. Referring to FIG. 6 and FIG. 9, the sampling range is determined by the circuit scheme of the display panel. Subpixels being apart away from each other are hard to be driven by a same driving circuit. Furthermore, mosaic effect will become significant when the distance between subpixels sharing a same driving circuit is too far, which will degrade the display effect dramatically. It should be noted that although the number of subpixels in a sampling range can be any value with enough calculators, the benefits cannot weigh the cost.

Secondly, the number of subpixels in a sampling range is smaller than ten. To sample a subpixel, an arithmetic average or weighted average will be calculated to process the input display data, which requires multipliers. The more pixels are considered, the more parallel multipliers are required within each pipeline of control logic 104. Processing display data of more than ten pixels will burden the processor of the display panel too much. Although the limited by a capability of data processing of the controller of the display panel can be overcome with enough calculators, the benefits cannot weigh the cost.

In other implementations, the above limitations can be ignored for display panels that can store display data of a whole frame, for example, a display panel with an application process. It is to be appreciated that the two limitations listed above are designed to optimize the rendering method provided by the present disclosure for an exemplary purpose only and without limitations.

Figure 16:
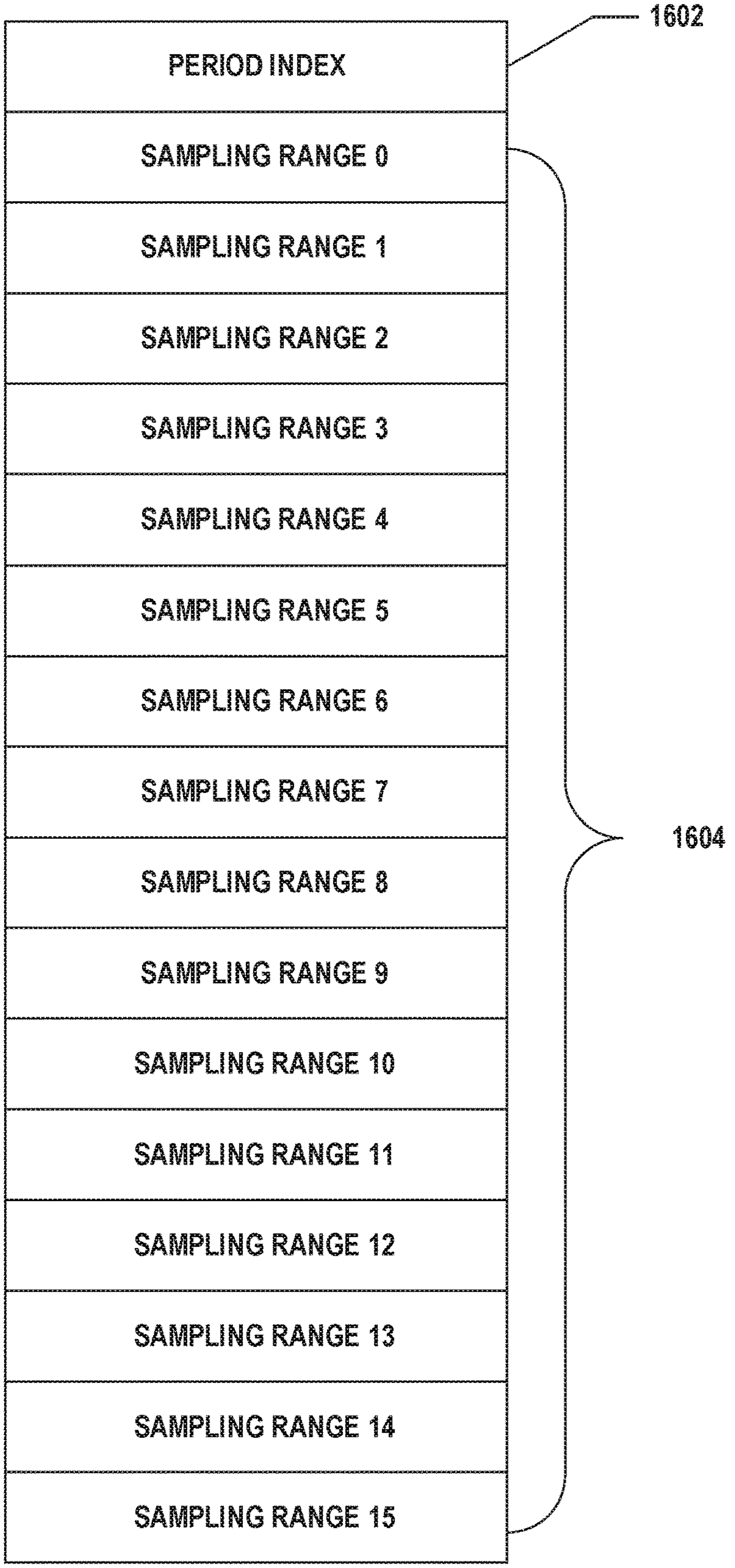
FIG. 16 is a rendering table including a period index and a plurality of sampling ranges for one type of subpixels in accordance with an implementation.

Then proceeds to operation 1308, input display data for each subpixel are sampled based on the selected sampling range of the subpixel. In one implementation, as shown in FIG. 14, each repeating module in the first database is assigned a first index number, for example, A to P. The repeating module can be selected by retrieving the first index number. The repeating module being employed can be same or different with an actual repeating cycle of the subpixels of the UDC region. In an example, 8 subpixels are included in an actual repeating cycle of display panel in FIG. 5A, thus the repeating module and the actual repeating cycle for display panel in FIG. 5A are the same. In another example, 48 subpixels are included in an actual repeating cycle of display panel in FIG. 8. To decrease the calculation amount, the first repeating module 810 or second repeating module 820 are employed in this example as only five sampling strategies are needed for the subpixels in FIG. 8. Referring to FIG. 16, a rendering table is provided as an example. Period index 1602 refers to the first index number corresponding to different repeating modules, i.e., repeating modules A to P in FIG. 14. Sampling ranges 1604 refer to the sampling range for each position of the repeating module. Sixteen sampling ranges are provided in the present implementation according to the sixteen repeating modules in FIG. 14. For example, sampling range 0 refers to the sampling range of the subpixel in the first position of the repeating module, and sampling range 15 refers to the sampling range of the subpixel in the sixteen positions of the repeating module.

FIG. 17 is an example of the rendering table in FIG. 16. Period index is N means that the repeating module N in FIG.

14 is retrieved in operation 1302. Repeating module N is a 4×3 matrix with twelve positions, which means the sampling strategies for the twelve positions are different. Following the rules of repeating module N, a row counter period of four rows and a column counter with period of three columns is determined. Whenever the row counter is y (y=1, 2, 3, 4) and the column counter is x (x=1, 2, 3), the sampling strategy corresponding to the yth row and xth column position listed in repeating module N is executed. Sampling range 0 is U, meaning that the sampling range for the first position (x=y=1) is sampling range U in FIG. 15. Sampling range 7 is Q, meaning that the sampling range for the eighth position (x=2, y=4) is sampling range Q in FIG. 15. Sampling range 12 to 15 are null because there are twelve positions in repeating module N. The sampling range for other positions in repeating module N is listed in the rendering table. It is possible for subpixels in different positions to have a same sample range. As the actual position corresponding to the central subpixel of sampling range of each subpixel is different, the actually applied sampling ranges for each of the sixteen positions are also different from each other even some of them probably own same sampling range index.

It is noted that in a repeating module, some subpixels are driven directly by the source lines and gate lines, like subpixels R11, B11, and G11 in FIG. 9, and subpixels R21, B21, and G21 in FIG. 11; some subpixels are not driven directly by the source lines and gate lines, like subpixels R12, B12, and G12 in FIG. 9, and subpixels R22, B22, and G22 in FIG. 11. When a sampling strategy is assigned to a directly driven subpixel, like subpixel R11, the sampling strategy will be performed based on the sampling strategy. When a sampling strategy is assigned to an indirectly driven subpixel, like subpixel R12, the calculation of the sampling strategy doesn't take any effect because the rendering information of the indirectly driven subpixel is not determined by the subpixel itself.

In another implementation, the correspondences include a first correspondence between a number of red subpixels driven by a same driving unit; a second correspondence between a number of green subpixels driven by a same driving unit; and a third correspondence between a number of blue subpixels driven by a same driving unit. Referring to FIG. 18, one rendering table is used for rendering subpixels in a single channel. In most cases, the repeating module and sampling ranges for subpixels of red channel, green channel, and blue channel are different. A three-dimensional rendering table shown in FIG. 18 is provided for subpixels in different color channels. A period index R refers to the first index number corresponding to different repeating modules for red subpixels, a period index G refers to the first index number corresponding to different repeating modules for green subpixels, and a period index B refers to the first index number corresponding to different repeating modules for blue subpixels. The three-dimensional table in FIG. 18 can achieve a precise rendering by distinguishing the different color channels.

FIG. 19 is an example of the rendering table in FIG. 18. For example, for subpixels in red channel, period index R is B, a 2×1 matrix, which means subpixels in red channel at odd-numbered rows employs sampling range U, and subpixels in red channel at even-numbered rows employ sampling range T. Referring to FIGS. 9-12C, sampling ranges U and T are designed for correspondences of three by one and six by one, which means only red subpixel R11 within first repeating module and red subpixel R21 within second repeating module are driven directly. Although all the red subpixels are assigned with a sampling range, only red subpixels R11 and R21 will be driven and rendering directly; other red subpixels will share the same rendering information with red subpixels R11 and R21. The sampling range U takes all the red subpixels in first repeating module without missing any information. Similarly, the sampling range T takes all the red subpixels in second repeating module without missing any information.

In the present implementation, for subpixels in green channel, period index G is A, a 1×1 matrix, which means all the subpixels in green channel share a same sampling range U. in each first and second repeating module shown in FIGS. 9-12C, only one green subpixel is driven directly. Sampling applied on subpixel G11 and G21 is valid and covers all the information of green pixels in the first and second repeating module, while sampling applied on subpixels other than G11 and G21 is invalid and has no effect on the rendering result. The subpixels in blue channel are similar to the subpixels in red channel and will not repeat here.

Then proceeds to operation 1310. The subpixels are rendered based on the sampled input display data. Method 1300 for rendering a display panel in the present disclosure includes a fixed part and an adjustable part. The fixed part is the common part suitable for every type of display panel, while the adjustable part can be tailor-made to fit the correspondence of a certain type of display panel. As a part of the adjustable part, possible sampling ranges are pre-designed and enumerated. When a correspondence of a display is confirmed, a corresponding sampling range for each subpixel is retrieved by its index number to obtain an optimal sampling range. As long as a sampling range corresponding to a certain type of display panel is pre-designed and pre-stored, an optimal display effect can be achieved by the rendering method provided by the present disclosure. Similarly, possible repeating modules of the subpixels of the display panel can be pre-designed and enumerated as well. The sampling ranges relate to the repeating modules by the position of the subpixel in the repeating module. By changing the adjustable part based on the correspondence of a display panel, the method provided by the present disclosure can solve the abovementioned problem without additional cost.

Figure 20:
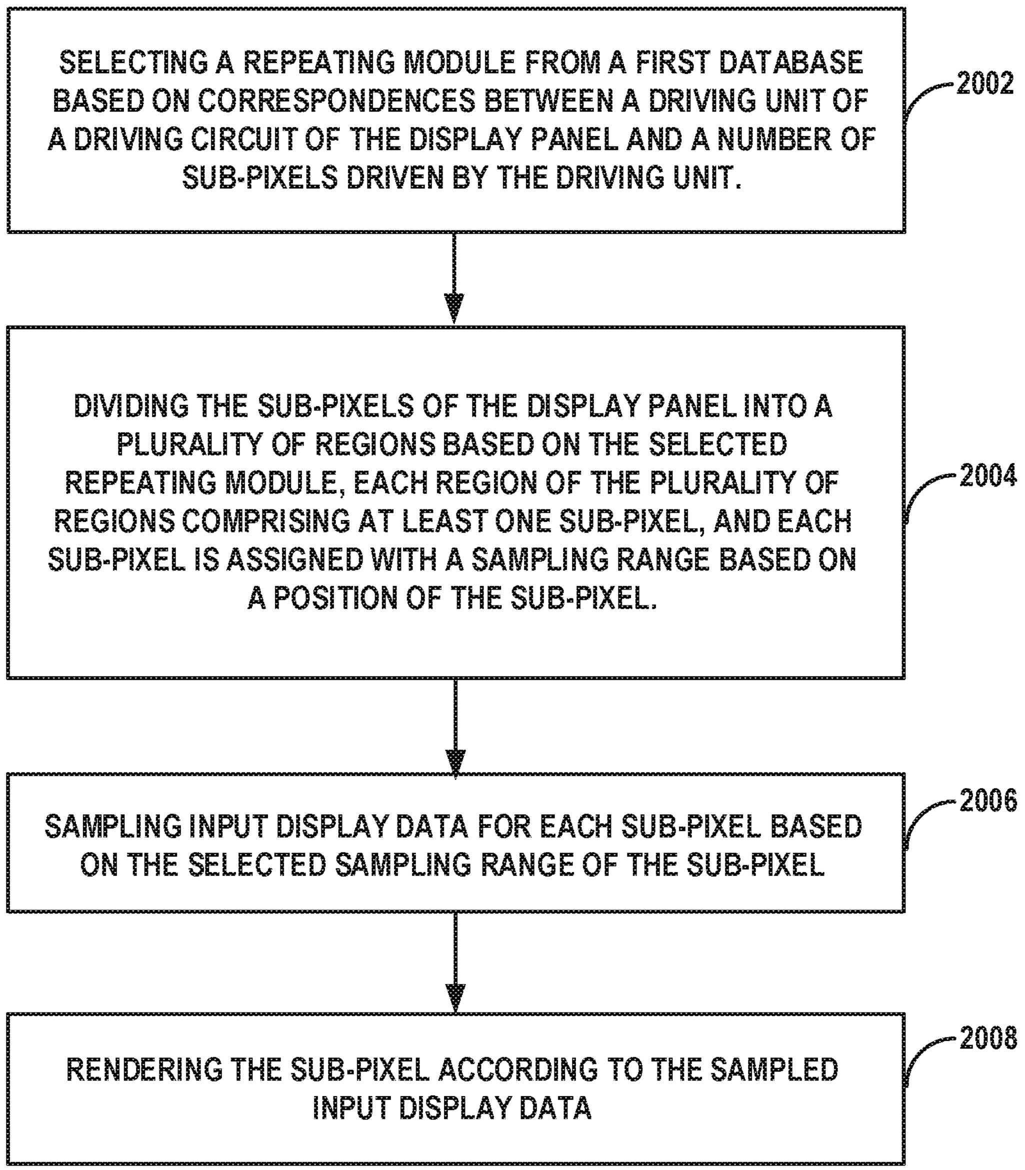
FIG. 20 is a depiction of another exemplary method for rendering a display panel in accordance with an implementation.

FIG. 20 illustrates a flow chart of a method 2000 for rendering subpixels of a display panel. Starting at operation 2002, a repeating module is selected from a first database based on correspondences between a driving unit of a driving circuit of the display panel and a number of subpixels driven by the driving unit. At operation 2004, the subpixels of the display panel are divided into a plurality of regions based on the selected repeating module, each region of the plurality of regions including at least one subpixel, and each subpixel is assigned with a sampling range based on a position of the subpixel. At operation 2006, input display data are sampled for each subpixel according to the sampling range of the subpixel. At operation 2008, the subpixels are rendered based on the sampled input display data. The first database includes a plurality of pre-stored repeating modules corresponding to a plurality of design strategies one by one. Method 2000 differs from method 1300 in that the sampling range for each position of a repeating module is embedded in the repeating module. As long as the repeating module is determined, the sampling range for each position is determined without further operation.

The present disclosure further provides a display panel including an under-display camera. The display panel includes a processor configured to, upon executing instructions: select a repeating module from a first database based on correspondences between a driving unit of a driving circuit of the display panel and a number of subpixels driven by the driving unit; divide the subpixels of the display panel into a plurality of regions based on the selected repeating module, each region of the plurality of regions including at least one subpixel; select a sampling range for each subpixel from a second database based on a position of the subpixel; sample input display data for each subpixel based on the selected sampling range of the subpixel; and render the subpixel according to the sampled input display data. The first database includes a plurality of pre-stored repeating modules corresponding to the correspondences one by one, and the second database includes a plurality of pre-stored sampling ranges corresponding to a plurality of positions in a plurality of repeating modules.

The above detailed description of the disclosure and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

What is claimed is:

1. A method for rendering sub-pixels of a display panel, wherein the sub-pixels comprise a plurality of first sub-pixels driven by a plurality of first driving units, and the method comprises:

determining, for each first driving unit, a first number of first sub-pixels driven by one first driving unit, wherein the first number is greater than one;

selecting, based on the first number, a first module of pixels from a first database, wherein each pixel of the first module corresponds to one first sub-pixel respectively, an arrangement of the pixels corresponds to an arrangement of the first sub-pixels, and a number of the pixels in the first module equals the first number of the first sub-pixels driven by one first driving unit;

dividing the sub-pixels of the display panel into a plurality of rendering regions based on the first module, wherein a second number of the first sub-pixels in each rendering region equals the first number;

obtaining, from a second database, respective sampling ranges for the first sub-pixels of each rendering region;

sampling input display data for each first sub-pixel of each rendering region based on the sampling ranges; and rendering each first sub-pixel of each rendering region according to the sampled input display data.

2. The method of claim 1, wherein the sub-pixels comprise:

a plurality of second sub-pixels driven by a plurality of second driving units, wherein a third number of the second sub-pixels driven by the second driving unit is smaller than the first number; and a plurality of third sub-pixels driven by a plurality of third driving units, wherein a fourth number of the third sub-pixels driven by the third driving unit is smaller than the first number; and each pixel of the first module is represented by one first sub-pixel and at least one of the second sub-pixel and the third sub-pixel.

3. The method of claim 2, wherein the first database is configured to store a plurality of modules of pixels comprising the first module and a second module, wherein a first size of the first module is different from a second size of the second module; or a first arrangement of the first module is different from a second arrangement of the second module.

4. The method of claim 3, wherein each module of pixels is assigned with a rendering index number; and the first module is selected by retrieving a first rendering index number corresponding to the first module.

5. The method of claim 2, obtaining sampling ranges for the first sub-pixels of each rendering region comprising:

determining positions of the first sub-pixels in each rendering region, wherein the positions of the first sub-pixels in each rendering region correspond to the positions of the pixels represented by the first sub-pixels in the first module, respectively.

6. The method of claim 5, wherein selecting sampling ranges for the first sub-pixels comprises:

selecting a first sampling range corresponding to the first sub-pixel at a first position of a first rendering region of the rendering regions; and selecting a second sampling range corresponding to the first sub-pixel at a second position of the first rendering region, wherein the first position is different from the second position.

7. The method of claim 6, further comprising:

selecting respective sampling ranges for the second sub-pixels and the third sub-pixels.

8. The method of claim 6, wherein the first sampling range comprises:

a central pixel represented by the first sub-pixel at the first position.

9. The method of claim 8, wherein the first sampling range further comprises:

a peripheral pixel represented by the first sub-pixel at a third position adjacent to the first position.

10. The method of claim 9, wherein a maximum distance between the peripheral pixel and the central pixel is smaller than or equal to two pixels.

11. The method of claim 6, wherein each sampling range is assigned with a respective sampling index number;

the first sampling range is selected by retrieving a first sampling index number corresponding to the first sampling range; and the second sampling range is selected by retrieving a second sampling index number corresponding to the second sampling range.

12. The method of claim 6, wherein two adjacent rendering regions are rendered at different times, and the sub-pixels in one of the rendering regions are rendered at a same time.

13. A method for rendering sub-pixels of a display panel, wherein the sub-pixels comprise a plurality of first sub-pixels driven by a plurality of first driving units, and the method comprises:

determining, for each first driving unit, a first number of first sub-pixels driven by one first driving unit, wherein the first number is greater than one;

selecting, based on the first number, a first module of pixels from a first database, wherein each pixel of the first module corresponds to one first sub-pixel respectively, an arrangement of the pixels corresponds to an arrangement of the first sub-pixels, and a number of the pixels in the first module equals the first number of the first sub-pixels driven by one first driving unit;

dividing the sub-pixels of the display panel into a plurality of rendering regions based on the first module, wherein a second number of the first sub-pixels in each rendering region equals the first number; obtaining, from a second database, respective sampling ranges to the first sub-pixels of each rendering region based on positions of the first sub-pixels in each rendering region;

sampling input display data for each sub-pixel of each rendering region based on the sampling ranges; and rendering each sub-pixel of the rendering region according to the sampled input display data.

14. The method of claim 13, wherein the sub-pixels further comprise:

a plurality of second sub-pixels driven by a plurality of second driving units, wherein a third number of the second sub-pixels driven by the second driving unit is smaller than the first number; and a plurality of third sub-pixels driven by a plurality of third driving units, wherein a fourth number of the third sub-pixels driven by the third driving unit is smaller than the first number; and each pixel of the first module is represented by one first sub-pixel and at least one of the second sub-pixel and the third sub-pixel.

15. The method of claim 13, wherein each module of pixels is assigned a rendering index number; and the first module is selected by retrieving a first rendering index number corresponding to the first module.

16. The method of claim 13, wherein the positions of the first sub-pixels in each rendering region correspond to positions of the pixels represented by the first sub-pixels in the first module, respectively.

17. The method of claim 13, wherein obtaining the sampling ranges for the first sub-pixels of each rendering region comprises:

assigning a first sampling range corresponding to the first sub-pixel at a first position of a first rendering region of the rendering regions; and assigning a second sampling range corresponding to the first sub-pixel at a second position of the first rendering region, wherein the first position is different from the second position.

18. The method of claim 17, wherein the first sampling range comprises:

a central pixel represented by the first sub-pixel at the first position; and a peripheral sub-pixel represented by the first sub-pixel at a third position adjacent to the first position.

19. The method of claim 17, wherein two adjacent rendering regions are rendered at different times, and the sub-pixels in one of the rendering regions are rendered at a same time.

20. A display panel comprising sub-pixels and a processor, wherein the sub-pixels comprise a plurality of first sub-pixels driven by a plurality of first driving units, and the processor is configured to, upon executing instructions:

determining, for each first driving unit, a first number of first sub-pixels driven by one first driving unit, wherein the first number is greater than one; selecting, based on the first number, a first module of pixel from a first database, wherein each pixel of the first module corresponds to one first sub-pixel respectively, an arrangement of the pixels corresponds to an arrangement of the first sub-pixels, and a number of the pixels in the first module equals the first number of the first sub-pixels driven by one first driving unit; dividing the sub-pixels of the display panel into a plurality of rendering regions based on the first module, wherein a second number of the first sub-pixels in each rendering region equals the first number; obtaining, from a second database, respective sampling ranges for the first sub-pixels of each rendering region from a second database;

sampling input display data for each first sub-pixel of each rendering region based on the sampling ranges; and rendering each first sub-pixel of each rendering region according to the sampled input display data.

* * * * *